(12) United States Patent
Wei et al.

(10) Patent No.: US 11,212,787 B2
(45) Date of Patent: Dec. 28, 2021

(54) SWITCH BETWEEN SUB PRB AND NORMAL PRB ALLOCATIONS FOR EMTC

(71) Applicant: QUALCOMM Incorporated, San Diego, CA (US)

(72) Inventors: Chao Wei, Beijing (CN); Hao Xu, Beijing (CN); Wanshi Chen, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 88 days.

(21) Appl. No.: 16/627,953

(22) PCT Filed: Aug. 9, 2018

(86) PCT No.: PCT/CN2018/099609
§ 371 (c)(1),
(2) Date: Dec. 31, 2019

(87) PCT Pub. No.: WO2019/029614
PCT Pub. Date: Feb. 14, 2019

(65) Prior Publication Data
US 2020/0137731 A1 Apr. 30, 2020

(30) Foreign Application Priority Data
Aug. 11, 2017 (CN) .................. PCT/CN2017/097029

(51) Int. Cl.
*H04W 72/04* (2009.01)
(52) U.S. Cl.
CPC ................................ *H04W 72/042* (2013.01)
(58) Field of Classification Search
CPC ............................ H04W 72/04; H04W 72/042
See application file for complete search history.

(56) References Cited

U.S. PATENT DOCUMENTS

| 2011/0122860 A1 | 5/2011 | Guan et al. |
| 2012/0069764 A1 | 3/2012 | Classon et al. |

(Continued)

FOREIGN PATENT DOCUMENTS

| CN | 102238732 A | 11/2011 |
| CN | 103986566 A | 8/2014 |

(Continued)

OTHER PUBLICATIONS

Supplementary European Search Report—EP18843339—Search Authority—The Hague—Feb. 9, 2021.

(Continued)

*Primary Examiner* — Chi Ho A Lee
*Assistant Examiner* — Andrew Lee
(74) *Attorney, Agent, or Firm* — Procopio, Cory, Hargreaves LLP; Nerrie M. Zohn

(57) ABSTRACT

Enhanced Machine Type Communications (eMTC) is a wireless communication technology with reduced system bandwidth. To improve spectral efficiency, user equipment (UE) is configured to receive first downlink control information (DCI) from a base station. The first DCI indicates a resource block (RB) sized frequency allocation for the UE. Additionally, the UE is configured to receive second DCI from the base station. The second DCI indicates a sub RB sized frequency allocation for the UE. The UE is configured to transmit a plurality of uplink data transmissions to the base station in a variable frequency allocation such that the plurality of uplink data transmissions switches between using the RB sized frequency allocation and the sub RB sized frequency allocation. Thus, by using the sub RB sized frequency allocation, more UEs can be allocated to the same RB without lowering the data rate thereby improving total uplink capacity.

31 Claims, 15 Drawing Sheets

(56) References Cited

U.S. PATENT DOCUMENTS

| | | | |
|---|---|---|---|
| 2016/0183203 A1* | 6/2016 | Larsson | H04W 52/38 370/329 |
| 2017/0222759 A1* | 8/2017 | Meng | H04W 72/0406 |
| 2017/0223673 A1 | 8/2017 | Dinan et al. | |
| 2018/0152954 A1* | 5/2018 | Golitschek Edler Von Elbwart | H04L 5/001 |
| 2018/0367278 A1* | 12/2018 | Chatterjee | H04L 1/1858 |
| 2019/0223162 A1* | 7/2019 | Suzuki | H04W 72/04 |
| 2019/0342777 A1* | 11/2019 | Tiirola | H04W 24/08 |
| 2020/0068608 A1* | 2/2020 | Ye | H04W 72/04 |
| 2020/0100316 A1* | 3/2020 | Liu | H04W 72/042 |
| 2020/0187237 A1* | 6/2020 | Su | H04W 72/0453 |
| 2020/0389870 A1* | 12/2020 | Shin | H04W 72/042 |
| 2021/0105819 A1* | 4/2021 | Takeda | H04W 72/04 |
| 2021/0135791 A1* | 5/2021 | Wang | H04L 1/0009 |

FOREIGN PATENT DOCUMENTS

| | | |
|---|---|---|
| EP | 3379877 A1 | 9/2018 |
| WO | 2017119720 A2 | 7/2017 |

OTHER PUBLICATIONS

International Search Report and Written Opinion—PCT/CN2017/097029—ISA/EPO—dated Apr. 28, 2018.
International Search Report and Written Opinion—PCT/CN2018/099609—ISA/EPO—dated Oct. 24, 2018.

* cited by examiner

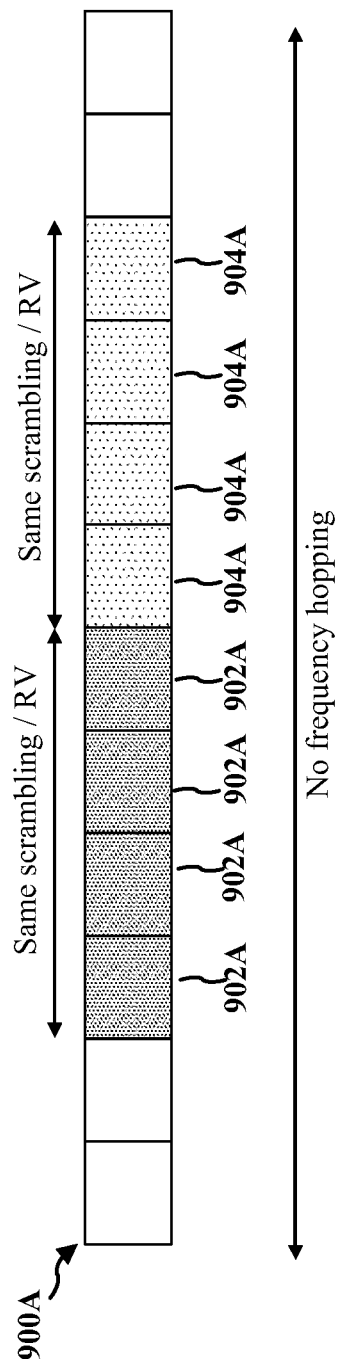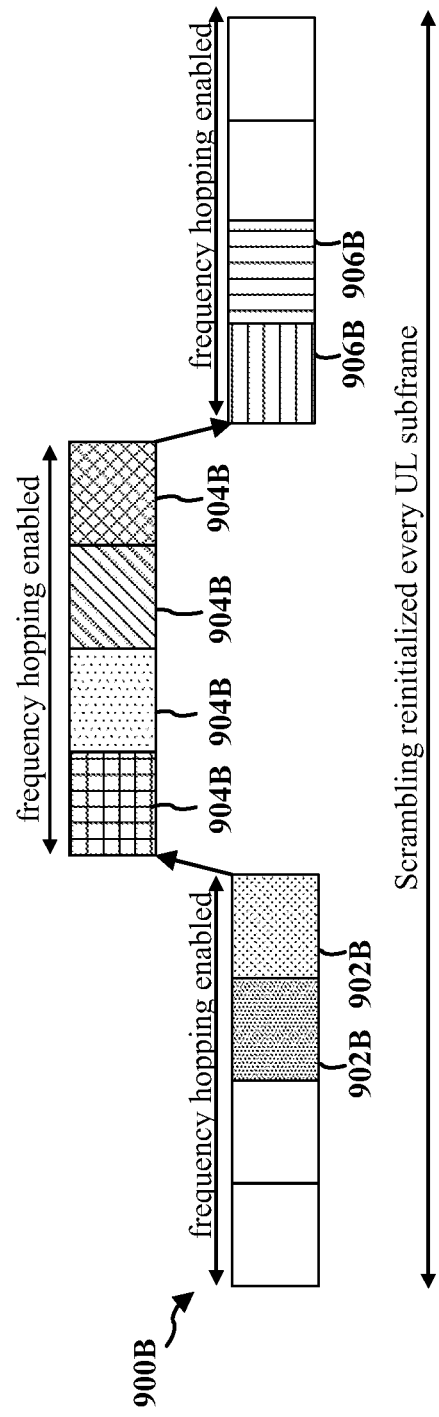
FIG. 9A
FIG. 9B

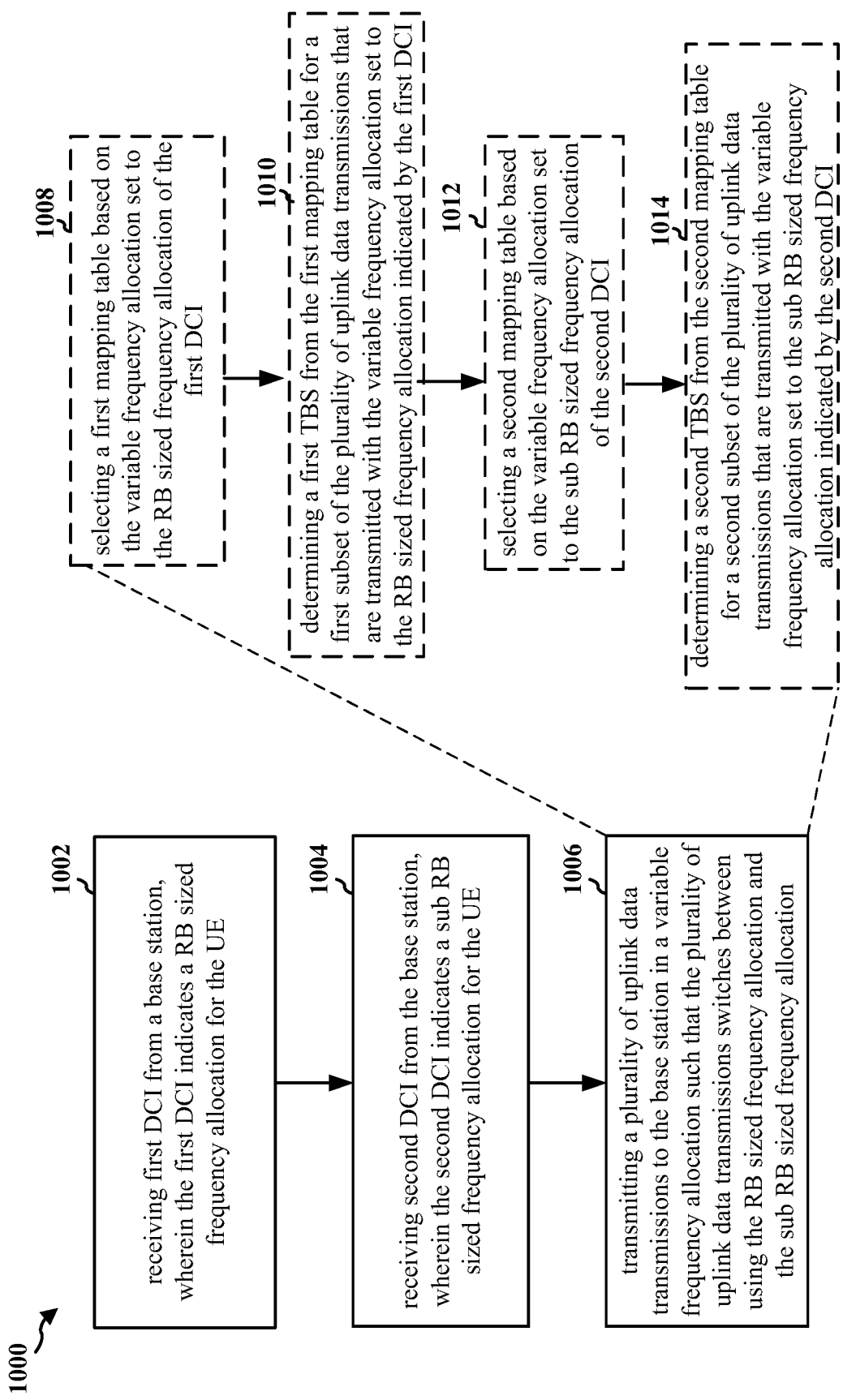

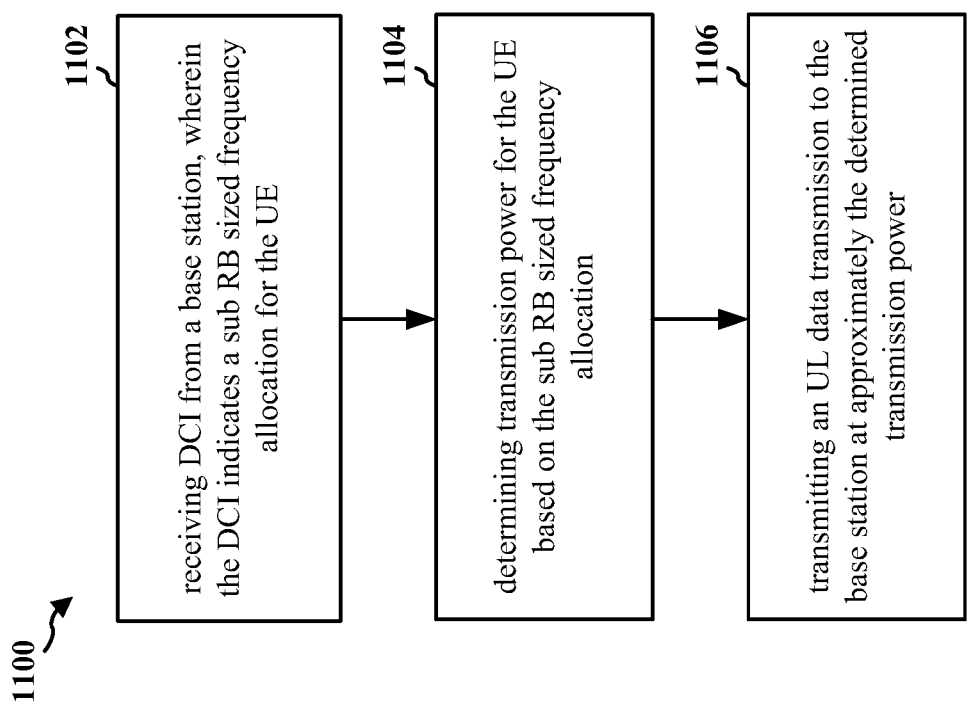

SWITCH BETWEEN SUB PRB AND NORMAL PRB ALLOCATIONS FOR EMTC

CROSS-REFERENCE TO RELATED APPLICATIONS(S)

This application is a National Phase of PCT Application International Application No. PCT/CN2018/099609, entitled "SWITCH BETWEEN SUB PRB AND NORMAL PRB ALLOCATIONS FOR eMTC" and filed on Aug. 9, 2018, which claims the priority benefit of PCT Application International Application No. PCT/CN2017/097029, entitled "SWITCH BETWEEN SUB PRB AND NORMAL PRB ALLOCATIONS FOR eMTC" and filed on Aug. 11, 2017, which are expressly incorporated by reference herein in their entirety.

BACKGROUND

Technical Field

The present disclosure relates generally to communication systems, and more particularly, to narrowband wireless communication systems.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

A focus of the traditional LTE design is the improvement of spectral efficiency, coverage ubiquity, and enhanced quality of service (QoS) support, etc. Current LTE system downlink (DL) and uplink (UL) budgets may be designed for coverage of high end devices, such as state-of-the-art smartphones and tablets. However, it may be desirable to support low cost low rate devices as well. Nevertheless, supporting these low cost low rate devices may involve reducing the maximum system bandwidth (e.g., a narrowband bandwidth), using a single receive radio frequency (RF) chain in UEs, reducing peak data rates, reducing transmit power, performing half duplex operations, etc.

One example of such narrowband wireless communication is enhanced machine type communication (eMTC). eMTC presents unique challenges due to the limited frequency resources of its narrowband. In particular, eMTC is generally limited to six resource blocks (RBs) of system bandwidth. Additionally, low power operations may be very important in order for eMTC enabled devices to maintain a low complexity.

As such, systems and techniques are needed for eMTC which increase spectral efficiency and optimize limited power resources.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Narrowband wireless communication involve unique challenges due to the limited frequency dimension of the narrow band. One example of such narrowband wireless communication is eMTC, which is limited to six physical RBs (PRBs) of system bandwidth. Multiple users may utilize the narrow band. While only some of the UEs may be active at a particular time, the narrowband communication should support such multi-user capacity. However, with current eMTC technology, the minimum frequency allocation for UL data transmissions from a UE is a PRB thereby limiting the number of UEs that can provide UL data transmissions simultaneously to a base station. In addition, eMTC communication systems may provide for deep coverage by accounting for devices in environments requiring different Coverage Enhancement (CE) levels. For example, some devices may need as much as 20 dB of CE. Given the limited power resources of eMTC UEs, operating in deep coverage scenarios may be difficult for UEs.

In an aspect of the disclosure, a method, a computer-readable medium, and an apparatus are provided. The apparatus (e.g., a UE) is configured to receive a first DL control information (DCI) from a base station. The first DCI indicates a RB sized frequency allocation for the UE. Additionally, the apparatus is configured to receive a second DCI from the base station. The second DCI indicates a sub RB sized frequency allocation for the UE. The apparatus is configured to transmit a plurality of UL data transmissions to the base station in a variable frequency allocation such that the variable frequency allocation switches between the RB sized frequency allocation and the sub RB sized frequency allocation. Thus, by using the sub RB sized frequency allocation, more UEs can be allocated to the same PRB without lowering the data rate and thus improving total UL capacity.

In another aspect of the disclosure, a method, a computer-readable medium, and an apparatus are provided. The apparatus (e.g., a UE) is configured to receiving DCI from a base station. The DCI indicates a sub RB sized frequency allocation for the UE. The UE is configured to determine transmission power for the UE based on the sub RB sized frequency allocation. Additionally, the apparatus is configured to transmit an UL data transmission to the base station at approximately the determined transmission power. Since the determined transmission power is based on the sub RB sized frequency allocation, power resources may be concentrated in less tones and thus UL data transmission in deep coverage scenarios can be transmitted with greater success.

In yet another aspect of the disclosure, a method, a computer-readable medium, and an apparatus are provided. The apparatus (e.g., a UE) is configured to receive first DCI from a base station, wherein the first DCI indicates a DL resource allocation for at least one DL data transmission. Additionally, the apparatus is configured to receive a second DCI from the base station, wherein the second DCI indicates a sub RB sized frequency allocation for at least one UL data transmission. The apparatus is configured to determine whether the first DCI and the second DCI indicate that there will be at least one collision between the at least one UL data transmission and at least one of an acknowledgement (ACK) or negative acknowledgement (NACK) in response to the at least one DL data transmission. As such, the apparatus is configured to adjust at least one of the at least one ACK or NACK and the at least one UL data transmission in response to determining that there will be at least one collision. In this manner, the apparatus may avoid collisions between ACK/NACK(s) and UL data transmissions transmitted in the sub RB sized frequency allocation.

In still another aspect of the disclosure, a method, a computer-readable medium, and an apparatus are provided. The apparatus (e.g., a UE) is configured to receive DCI from a base station, wherein the DCI indicates a sub RB sized frequency allocation for at least one UL data transmission from the apparatus. The DCI may also indicate whether frequency hopping is enabled for the apparatus. The apparatus is configured to transmit the at least one UL data transmission by employing a redundancy version (RV) cycling and scrambling sequence based on whether the frequency hopping is enabled. In this manner, the apparatus may support RV cycling and scrambling sequences for UL data transmissions associated with a transport block (TB) given the sub RB sized frequency allocation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 9A-9B are TD subframe diagrams that illustrate RV cycling and scrambling sequences employed by a UE based on whether frequency hopping is enabled for UL data transmissions in a sub RB sized frequency allocation.

FIG. 10 is a flowchart illustrating a method of eMTC wireless communication by a UE.

FIG. 11 is a flowchart illustrating a method of eMTC wireless communication by a UE.

DETAILED DESCRIPTION

Figure 1:
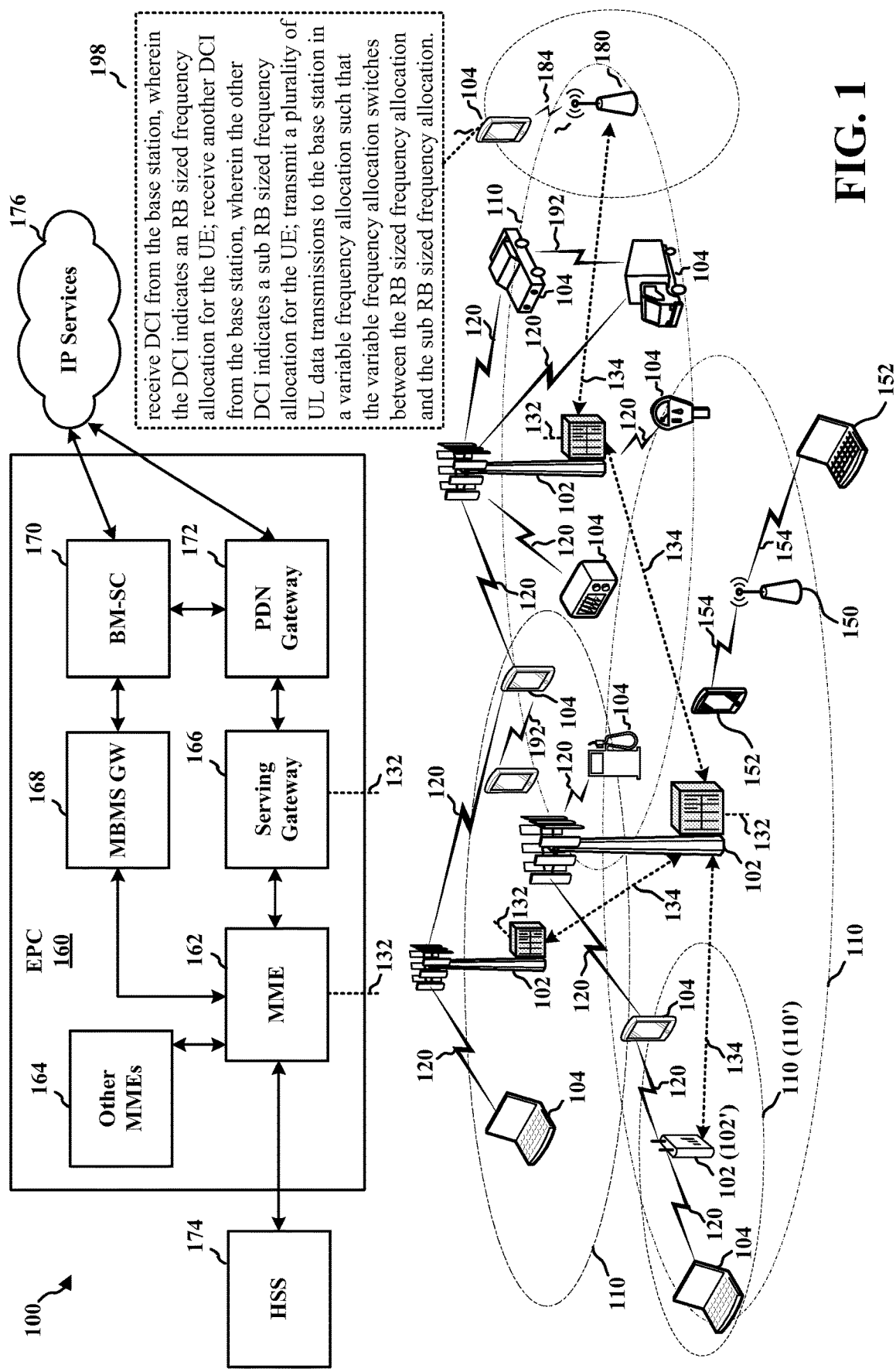
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In this disclosure, implementations of the UE 104 and the base station 180 utilize systems and techniques that help solve some of the unique challenges presented by the limited frequency resources of eMTC. As discussed below, the UE 104 and the base station 180 are configured to provide new eMTC functionality that provides greater spectral efficiency. More specifically, one of the major challenges of eMTC is that the system bandwidth of eMTC is limited to six RBs. While only some of the UEs may be active at a particular time, eMTC supports multi-user capacity.

However, the minimum allowed UL frequency allocation of current eMTC technology for UL data transmission in PUSCH is one PRB. Allocating a PRB to each user leads to significant spectral inefficiencies particularly when the base station 180 is trying to support multi-user capacity since eMTC is limited to six RBs. Thus, under current eMTC specifications, only six UEs can provide UL data transmissions to the base station 180 simultaneously. Accordingly, to accommodate more than six UEs, the base station 180 would have to distribute temporal resources among the UEs thereby reducing the data rate of UL data communications from the UEs to the base station 180. For example, the subframes that the UE 104 may utilize to transmit the same amount of data may increase as the number of UEs serviced by the base station 180 increases. Additionally, the UE 104 may suffer from power limitations in deep coverage scenarios. More specifically, the UE 104 may have to spread its limited power resources across the entire bandwidth of the PRB, which may result in increased transmission failures.

In this disclosure, systems and techniques for eMTC are disclosed herein that improve eMTC UL data transmissions from UEs (e.g., UE 104) to a base station (e.g., base station 180). The eMTC solutions described herein increase the spectral efficiency thereby allowing a base station to service more UEs simultaneously without degrading system data rates. Additionally, these solutions can lead to better use of power resources and thus may reduce UL transmission errors, particularly in deep coverage situations.

Referring again to FIG. 1, in certain aspects (see element 198), the UE 104 may be configured to receive DCI from the base station 180, wherein the DCI indicates an RB sized frequency allocation for the UE 104. The DCI may be received within a common search space, such as a common PDCCH search space. Additionally, the UE may also be configured to receive another DCI from the base station 180, wherein the other DCI indicates a sub RB sized frequency allocation for the UE 104. The other DCI may be received within a user specific search space, such as a user specific PDCCH search space. Accordingly, the UE 104 received two different frequency allocations for UL data transmissions, the RB sized frequency allocation and the sub RB sized frequency allocation. The RB sized frequency allocation may cover the entire bandwidth and thus all of the tones of a PRB. However, the sub RB sized frequency allocation may cover part of the bandwidth of a PRB and thus a (proper) subset of the tones of a PRB.

As such, the UE 104 is configured to transmit a plurality of UL data transmissions to the base station 180 in a variable frequency allocation such that the variable frequency allocation switches between the RB sized frequency allocation and the sub RB sized frequency allocation. Thus, a first (proper) subset of the UL data transmissions are transmitted with the variable frequency allocation set to the RB sized frequency allocation and a second (proper) subset of the UL data transmissions are transmitted with the variable frequency allocation set to the sub RB sized frequency allocation. By using the sub PRB sized frequency allocation (which has a smaller bandwidth than the RB sized frequency allocation) for eMTC UL data transmission from the UE 104, the base station 180 can allocate one or more other UEs to the same PRB and thereby increase the total UL capacity.

In one aspect, the RB sized frequency allocation may be used as fallback when the SNR is low and a good data rate cannot be achieved within the sub RB sized frequency allocation, as explained in further detail below. In another aspect, the sub PRB sized frequency allocation may be used with initial UL data transmissions and the RB sized frequency allocation may be used with UL data retransmissions of the initial UL data transmissions, as explained in further detail below.

It should be noted that the data rate of the UE 104 is not significantly affected and may in fact increase using the sub RB sized frequency allocation. For example, the UE 104 may concentrate transmission power in fewer tones when transmitting UL data transmissions in the sub RB sized frequency allocation and thus provide a better SNR to the base station 180. This is particularly helpful in reducing UL transmission errors in deep coverage scenarios.

Accordingly, in some examples, the UE 104 may be configured to determine transmission power for the UE 104 based on the sub RB sized frequency allocation. In some aspects, the transmission power is determined based on a number of tones provided by the sub RB sized frequency allocation. In other aspects, the transmission power is determined based on a fixed number of tones irrespective of the sub RB sized frequency allocation. In still other aspects, the transmission power is determined to be a maximum transmission power. The UE 104 may thus be configured to transmit UL data transmission to the base station 180 in the sub RB sized frequency allocation at approximately the determined transmission power. Accordingly, the UE 104 may utilize its limited power resources more efficiently by concentrating the transmission power in fewer tones, as provided by the sub RB sized frequency allocation.

In another aspect, the UE 104 is configured to receive (yet another) DCI from a base station 180, wherein the DCI indicates a DL resource allocation for at least one DL data transmission to the UE 104. The DCI that indicates the DL resource allocation may be received prior to the DCI that indicates the RB sized frequency allocation and prior to the DCI that indicates the sub RB sized frequency allocation, as explained in further detail below. The UE 104 may generate at least one ACK or NACK in response to one or more DL data transmissions from the base station 180.

Since the ACK/NACK and the UL data transmissions in the sub RB sized frequency allocation may both be provided in the PUSCH (e.g., narrowband PUSCH (NPUSCH)), the UE 104 may be configured to determine whether the first DCI and the second DCI indicate that there will be at least one collision between the at least one UL data transmission and at least one ACK/NACK. As such, the UE 104 is configured to adjust the ACK/NACK(s) and UL data transmission within the sub RB sized frequency allocation in response to determining that there will be at least one collision. As explained in further detail below, the UE 104 may implement a drop rule to prevent collisions or may implement a subframe delay to prevent a collision.

Cyclic based sequences currently employed with eMTC UL data transmissions may not be appropriate for UL data transmission in the sub RB sized frequency allocation since one TB can be communicated in the UL data transmissions (in the sub RB sized frequency allocation) of multiple subframe blocks. These subframe blocks may span up to 4 subframes and each subframe block may use different cyclic based sequences.

To solve this problem, the UE 104 may be configured to transmit the UL data transmissions in the sub RB sized frequency allocation by employing a RV cycling and scrambling sequence based on whether the frequency hopping is enabled. In one example, the RV cycling and scrambling sequence is reinitialized after a number of subframes greater than one when the frequency hopping is disabled, as explained in further detail below. The number of subframes may be based on a repetition level for the UL data transmissions in the sub RB sized frequency allocation. Additionally, the number of subframes may be based on a function of TBS and a number of tones provided by the sub RB sized frequency allocation. Finally, the RV cycling and scrambling sequence may be reinitialized after every subframe when the frequency hopping is enabled.

Figure 2:
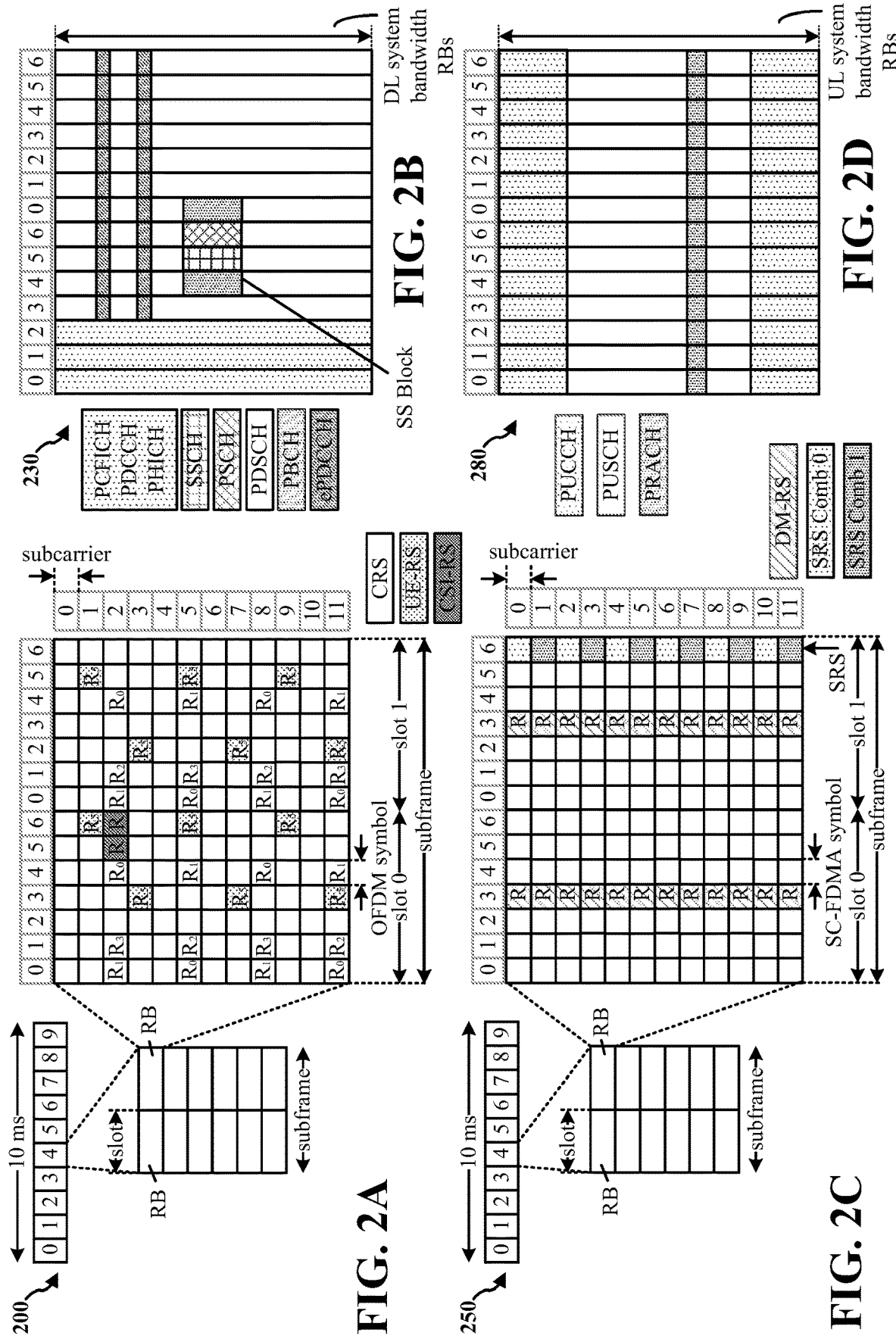
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
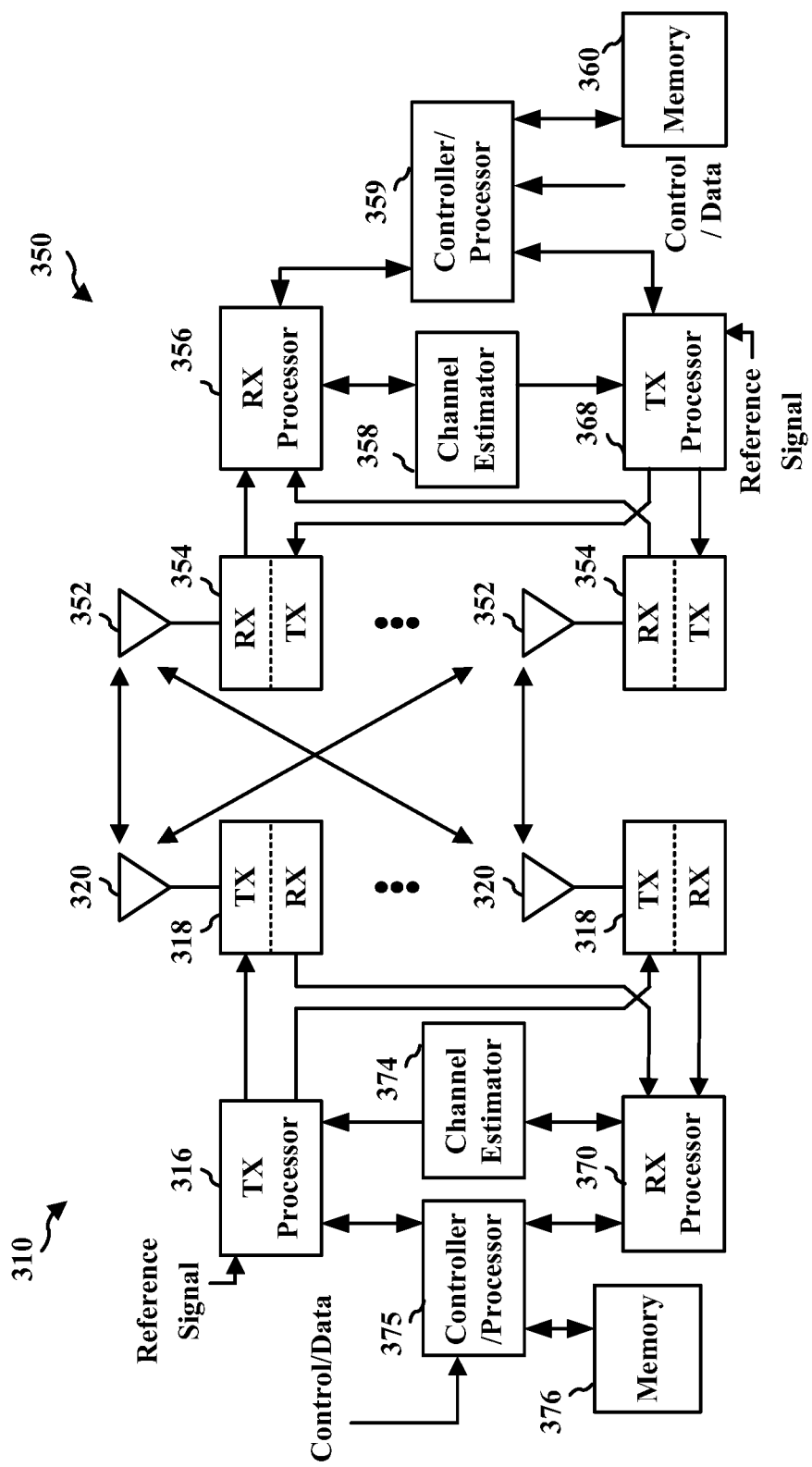
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Narrowband wireless communication involve unique challenges due to the limited frequency dimension of the narrow band. One example of such narrowband wireless communication is NB-IoT, which is limited to a single RB of system bandwidth, e.g., 180 kHz. Another example of narrowband wireless communication is machine type communications (MTC), which is limited to six RBs of system bandwidth.

Multiple users may utilize the narrow band. While only some of the UEs may be active at a particular time, narrowband communication should support such multi-user capacity.

Additionally, narrowband communications may need to provide for deep coverage, by accounting for devices in environments requiring different Coverage Enhancement (CE) levels. For example, some devices may need as much as 20 dB of CE, which results in greater uplink Transmission Time Interval (TTI) bundling, further limiting time resources.

NB-IoT communication may also involve a large cell radius, e.g., as much as approximately 35 km. Thus, the communication may involve a long delay, such as 200 μs, which may employ a long Cyclic Prefix (CP) length.

Similar challenges are involved with narrowband communication using MTC, e.g., with Category 0, low cost MTC UEs. An MTC UE may be implemented with reduced peak data rates (e.g., a maximum of 1000 bits for a transport block size (TBS) for some MTC). Further, an MTC UE may be limited to supporting rank 1 transmissions and/or having 1 receive antenna. When an MTC UE is half-duplex, the MTC UE may have a relaxed switching timing (switching from transmission to reception or reception to transmission) compared to legacy or non-MTC UEs in accordance with the LTE standards. For example, a non-MTC UE may have a switching time on the order of 20 microseconds, while an MTC UE may have a switching time on the order of 1 millisecond.

MTC UEs may monitor DL control channels in the same way as non-MTC UEs, e.g., monitoring wideband signals, monitoring for both PDCCH and EPDCCH, etc. Additional MTC enhancements may be supported. Although MTC UEs operate in a narrowband, the MTC UEs may also be capable of operation in a wider system bandwidth (e.g., 1.4/3/5/10/15/20 MHz). For example, the MTC UEs may work in a system bandwidth of 1.4 MHz and may use 6 resource blocks (RBs). Further, the MTC UEs may have enhanced coverage up to 15 dB.

In eMTC with extended coverage support, one or more channels may be bundled (e.g., repeated) in the time domain. In particular, bundled MTC PDCCH (MPDCCH, which is a type of NPDCCH) may use multiple subframes for transmission. Resources for an MPDCCH may be allocated by a base station in accordance with requirements for ePDCCH within the narrowband on which an eMTC UE is operating.

Figure 4:
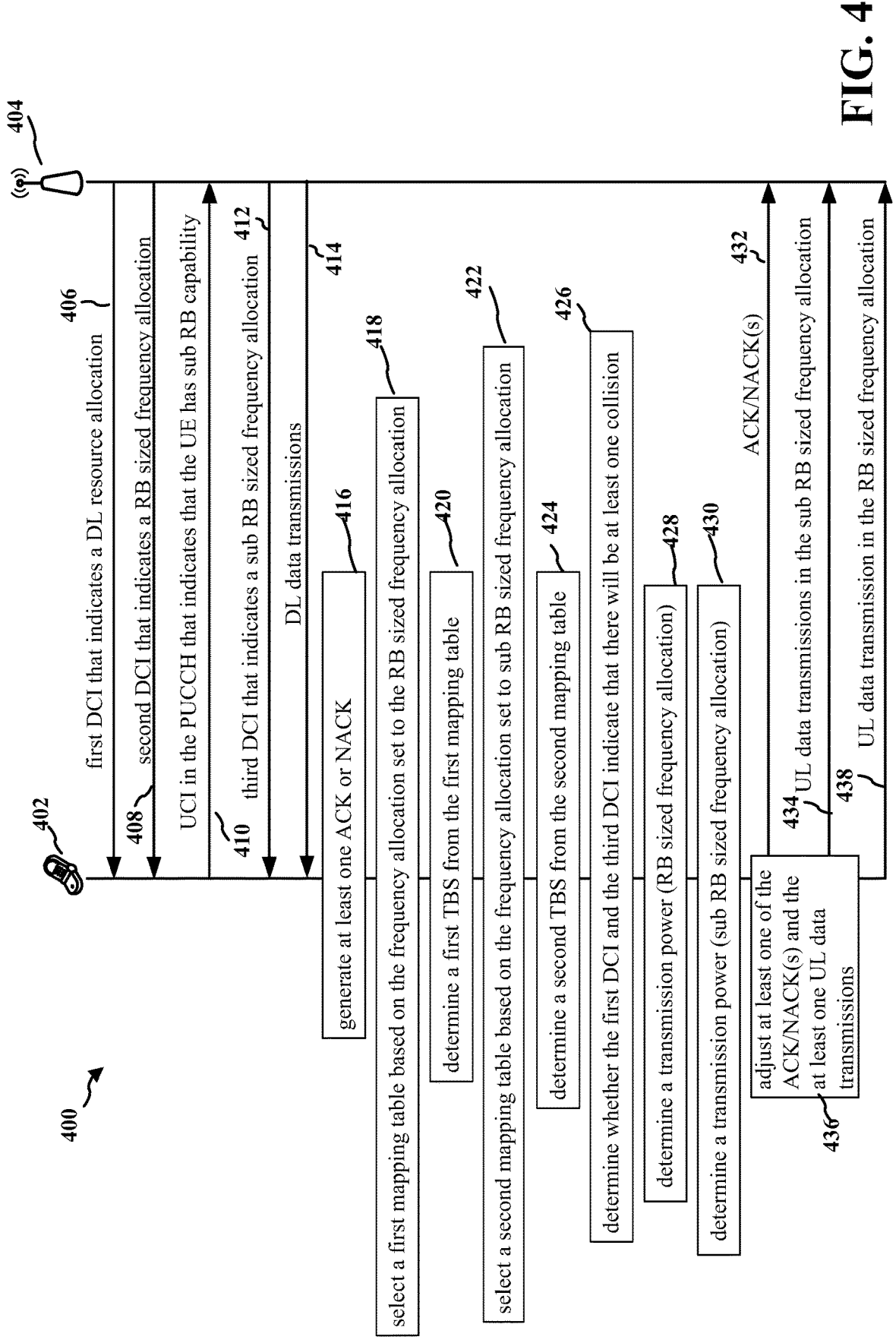
FIG. 4 is a call flow diagram for eMTC between a UE and a base station.

FIG. 4 illustrates a call flow diagram 400 that describes a call flow between a UE 402 and a base station 404. In particular, the call flow diagram 400 illustrates a set of procedures that may be implemented which allow the UE 402 and the base station 404 to utilize system resources more efficiently in eMTC. To do this, the UE 402 dynamically switches between a sub RB sized frequency allocation and an RB sized frequency allocation for UL data transmission within the PUSCH to the base station 404.

The UE 402 can be switched into the sub RB sized frequency allocation so that frequency and power resources can be utilized more efficiently. For example, the base station 404 may assign other UEs (not shown) to the same RB as the UE 402. Furthermore, since transmission power is limited in the UE 402, the UE 402 can concentrate its available power resources in less tones when providing UL data transmissions within the PUSCH in the sub RB frequency allocation. In deep coverage scenarios, the UE 402 may be switched into the sub PRB sized frequency allocation without significantly degrading the data rate of data transmissions within the PUSCH.

Accordingly, the UE 402 in this disclosure is configured to transmit UL data transmissions with a variable UL frequency allocation such that the variable UL frequency allocation is switched between an RB sized frequency allocation and a sub RB sized frequency allocation. To do this for eMTC, the UE 402 and the base station 404 are capable of dealing with several issues such as the control channel search spaces used for the sub RB sized frequency allocation, DCI formatting for the sub RB sized frequency allocation, uplink power control and power headroom report (PHR) communications, collision prevention between UL data transmissions in the sub RB sized frequency allocation and ACK/NACK feedback, and repetition and RV cycling.

With regards to DL for eMTC, the base station 404 is configured to transmit and the UE 402 is configured to receive a first DCI that indicates a DL resource allocation for at least one DL data transmission from the base station 404 to the UE 402 at procedure 406. The first DCI may be sent by the base station 404 in a PDCCH once RACH procedures have been initialized and the UE 402 and the base station 404 are synchronized. The base station 404 may be configured to transmit the first DCI in a PDCCH within the PDCCH search space. Information related to the PDCCH search space may have been previously broadcast in a physical DL channel, such as the PBCH. The UE 402 may decode the PDCCH search space to obtain the first DCI that indicates the DL resource allocation for the UE 402.

With regards to UL, the base station 404 is configured to transmit and the UE 402 is configured to receive second DCI that indicates a RB sized frequency allocation for the UE 402 within a common control channel at procedure 408. The RB sized frequency allocation may be for at least one UL data transmission from the UE 402 to the base station 404. Currently, eMTC specifies that each UE (e.g., the UE 402) is allocated to a different PRB, which is thus with a RB sized frequency allocation. In this disclosure, the RB sized frequency allocation may be used as fallback for UL data transmissions where the UL data transmissions are switched to being transmitted in the RB sized frequency allocations during certain conditions, such as when a SNR is low.

In one aspect, the base station 404 is configured to transmit the second DCI with the RB sized frequency allocation once RACH procedures have established a communications link between the UE 402 and the base station 404. The second DCI may be provided in a common control channel. The common control channel with the second DCI may be a common PDCCH provided in a common PDCCH search space. The common PDCCH search space includes other common PDCCH with DCI common to all of the UEs in the cell of the base station 404 including the UE 402. Thus, the UE 402 may decode the PDCCH candidates within the common PDCCH search space to obtain the second DCI with the PRB allocation (which is an RB sized frequency allocation) for the UE 402.

The second DCI may also include other information related to allocations for the UE, as described above. The second DCI (indicating the RB sized frequency allocation) may be provided in a first DCI format, such as DCI format 6-0A or DCI format 6-0B.

The RB sized frequency allocation may be an allocation within the PUSCH and may serve as a fallback frequency allocation when a sub PRB sized frequency allocation is not appropriate, such as when the SNR is low. As discussed above, in LTE technology (e.g., eMTC) each RB has 12 tones and a total bandwidth of 180 kHz in the RB. Thus, the RB sized frequency allocation may be an RB allocation where a particular PRB is assigned to the UE 402 and thus a set of 12 tones with a bandwidth of 180 kHz.

The sub RB sized frequency allocation for UL data transmission may be determined by a higher layer, such as the RRC. However, the base station 404 may not have any indication regarding whether the UE 402 is capable of providing UL data transmission in a sub RB sized frequency allocation for eMTC prior to random access channel (RACH) procedures. More specifically, prior to message 3 in the RACH procedures, (where the UE 402 transmits an RRC connection request to the base station 404), the base station 404 may have no indication that the UE 402 is capable of providing UL data transmission in a sub RB sized frequency allocation. Thus, after RACH procedures (in particular, after an RRC connection request is transmitted by the UE 402 and granted by the base station 404), the UE 402 may be configured to transmit and the base station 404 may be configured to receive UCI in the PUCCH that indicates that the UE 402 has sub RB capability for UL data transmissions at procedure 410.

After the base station 404 receives the UCI at procedure 410, the base station 404 is configured to transmit and the UE 402 is configured to receive third DCI within a user specific control channel at procedure 412. The third DCI indicates a sub RB sized frequency allocation for the UE 402. Like the RB sized frequency allocation, the sub RB sized frequency allocation is for at least one UL data transmission from the UE 402 to the base station 404. For instance, the third DCI may indicate a frequency allocation for the UE 402 where a (proper) subset of the tones in a PRB are allocated to the UE 402. In some aspects, 3 tones, 4 tones, or 6 tones in a PRB may be allocated to the UE 402 for UL data transmissions from the UE 402 to the base station 404. Thus, the frequency allocation would be a sub RB sized frequency allocation since less than all of the tones (e.g., less than the 12 tones for typical LTE technology) of the PRB are allocated to the UE 402. The sub RB sized frequency allocation may be a frequency allocation for eMTC within the PUSCH.

The sub RB sized frequency allocation is more spectrally efficient since other UEs (not shown) may also be allocated to the tones of the same RB not allocated to the UE 402. It should be noted that the PRB of the RB sized frequency allocation for the UE 402 at procedure 408 and the PRB of the sub RB sized frequency allocation for the UE 402 at procedure 412 may or may not be the same, as explained in further detail below.

The user specific control channel with the third DCI may be a user specific PDCCH provided in a user specific PDCCH search space. The user specific PDCCH search space includes other user specific PDCCH with DCI that is directed to specific UEs in the cell of the base station 404, including the UE 402. Thus, the UE 402 may decode the PDCCH candidates within the user specific PDCCH search space to obtain the third DCI that indicates the sub RB sized frequency allocation for the UE 402. The third DCI in the user specific PDCCH may be masked with an identifier that identifies the UE 402, such as the C-RNTI assigned to the UE 402.

The third DCI may also include other information related to allocations for the UE, as described above. In one aspect, the third DCI (indicating the sub RB sized frequency allocation) may be provided in a second DCI format. In some aspects, the second DCI format may be different than the first DCI format of the second DCI. For example, the second DCI format of the third DCI may be DCI format N0. In another aspect however, the second DCI format of the third DCI is the same as the first DCI format of the second DCI. Thus, the second DCI format of the third DCI may also be either DCI format 6-0A or DCI format 6-0B. For example, the first DCI format used to indicate the RB sized frequency allocation may be extended for use by the second DCI format to indicate the sub RB sized frequency allocation.

If the second DCI format of the third DCI is DCI format N0, then narrowband information for the sub PRB sized frequency allocation may be derived by higher layers of the UE 402. In other implementations, the narrowband information may be provided in a previously received UL grant. For example, the second DCI within the common search channel may indicate the narrowband information for the sub RB sized frequency allocation. In some aspects, when the second DCI format is DCI format N0, the second DCI format may have an allocation of (zero) padding bits such that the second DCI format has a payload size equal to a payload size of DCI format 6-1A or DCI format 6-1B. In this manner, the UE 402 does not have to perform additional blind decodes to obtain the third DCI. In other aspects, the second DCI format of the third DCI may also be DCI format 6-0A or 6-0B, just like the first DCI format of the second DCI. In this case, certain fields such as CSI request, SRS request may be reserved. In one aspect, when the first DCI format is extended for use by the second DCI format to indicate the sub RB sized frequency allocation, the CSI or SRS request fields provided in the first DCI format may be reserved for use by the second DCI format to indicate the sub RB sized frequency allocation.

At procedure 414, the base station 404 is configured to transmit and the UE 402 is configured to receive one or more DL data transmissions in the DL data allocation indicated by the first DCI. How many DL data transmissions are provided during one TTI by the base station 404 may depend on a DL repetition level. In one aspect, the first DCI provided at procedure 406 may further indicate the DL repetition level for DL data transmissions to the UE 402, where the DL repetition level is set by the base station 404. For example, if the DL repetition level is 1, a DL data transmission is not repeated and a particular DL data transmission is transmitted once. However, if the DL repetition level is greater than 1, then the base station 404 is configured to transmit and the UE 402 is configured to receive DL data transmissions in a number of DL subframes equal to the DL repetition level. In other words, the same DL data transmission is repeated in several subframes when the DL repetition level is greater than 1.

At procedure 416, the UE 402 is configured to generate at least one ACK or NACK in response to one or more of the DL data transmissions. As explained above, the ACK or NACK(s) indicate whether data in the DL data transmissions was decoded without error by the UE 402. As is apparent to one of ordinary skill in the art, the number of ACK or NACKs may not match the DL repetition level since repeated DL data transmissions may be used by the UE 402 to obtain the correct data even when one or more of the repeated DL data transmissions have errors. Thus, in some circumstances, a single ACK or NACK may be feedback for a set of repeated DL data transmissions.

TBSs for UL data may be chosen by the UE 402 in order to maximize peak data rates. With regard to the RB sized frequency allocation, the UE 402 is configured to select a first mapping table based on the variable UL frequency allocation set to the RB sized frequency allocation at procedure 418. At procedure 420, the UE 402 is then configured to determine a first TBS from the first mapping table for a first (proper) subset of UL data transmissions that are transmitted with the variable UL frequency allocation set to the RB sized frequency allocation indicated by the second DCI.

With regard to the sub RB sized frequency allocation, the UE 402 is configured to select a second mapping table based on the variable UL frequency allocation set to the sub RB sized frequency allocation at procedure 422. At procedure 424, the UE 402 is then configured to determine a second TBS from the second mapping table for a second (proper) subset of UL data transmissions that are transmitted with the variable UL frequency allocation set to the sub RB sized frequency allocation indicated by the third DCI. In some aspects, a largest TBS of the first mapping table is larger than a largest TBS of the second mapping table. For example, when the total UL bandwidth is set to be 1.4 MHz by the base station 404, the second mapping table may indicate that the largest TBS is 2536 bits for the sub RB sized frequency allocation while the first mapping table may indicate that the largest TBS is 2984 bits (assuming N_RU=10) for the RB sized frequency allocation.

Given that TBS sizes are selected, transport blocks of data for UL transmission by the UE 402 may undergo transport block encoding. For example, the UE 402 may be configured to encode the data by calculating a cyclic redundancy code (CRC) for a transport block, providing code block segmentation, attaching the CRC, providing turbo encoding, and providing rate matching with RV and code block concatenation.

Collisions between ACK/NACK transmissions within PUCCH (e.g., eMTC PUCCH (MPUCCH), which is a type of narrowband PUCCH (NPUCCH)) and the UL data transmission in the sub RB sized frequency allocation within PUSCH (e.g., eMTC PUSCH (MPUSCH), which is a type of narrowband PUSCH (NPUSCH)) may occur if proper action is not taken to prevent them. Thus, at procedure 426, the UE 402 is configured to determine whether the first DCI and the third DCI indicate that there will be at least one collision between the at least one UL data transmission in the sub RB sized frequency allocation and at least one of the ACK or NACK.

It should be noted that the first DCI from the base station 404 may indicate an ACK/NACK repetition level, so that the same ACK/NACK transmission is repeatedly transmitted in the sub RB frequency allocation over several subframes by the UE 402. The third DCI may also indicate a UL repetition level so that several UL data transmissions in the sub RB sized frequency allocation are repetitions of the same UL data transmissions. This of course may increase the probability of collisions between UL data transmissions and ACK/NACK transmissions. When a collision between UL data transmissions and at least one of an ACK or NACK are determined, the UE 402 may be configured to avoid the collision, as explained in further detail below. Different techniques for providing this adjustment and avoiding a collision are also discussed below.

The base station 404 and the UE 402 are also capable of efficiently handling PHR. At procedure 428, the UE 402 is configured to determine a transmission power for the (proper) subset of UL data transmissions that are transmitted with the variable UL frequency allocation set to the RB sized frequency allocation indicated by the second DCI. In one implementation, if the UL repetition level of UL data transmissions in the RB sized frequency allocation is greater than 2, then the UL transmission power is determined to be the maximum transmission power for NPUSCH. Otherwise, the transmission power for UL data transmissions in the RB sized frequency allocation is determined by $P_{NPUSCH,c}(i) = \min\{P_{CMAX,c}(i), 10 \log 10(M_{NPUSCH,c}(i) + P_{O\_NPUSCH,c} + \alpha_c(j)PL_c + f_c(i))\}$ where:

i is a subframe index that identifies a subframe j is a mode index, where 0 indicates semi-persistent SRS grants, 1 indicates dynamic PUSCH grants, and 2 indicates message 3 transmission c indicates the cell of the base station 404;

$P_{NPUSCH,c}(i)$ is the determined transmission power;

$P_{CMAX,c}(i)$ is the maximum transmission power allowed by the UE of the UE 402;

$M_{NPUSCH,c}(i)$ is the assigned NPUSCH bandwidth for cell c and subframe i;

$P_{O\_NPUSCH,c}$ is an assigned offset applied to an open loop operating point of cell c;

$\alpha_c(j)$ is an open loop scaling factor dynamically applied with semi-persistent SRS grants and dynamic PUSCH grants (i.e., j is equal to 0 or 1);

$PL_c$ is the path loss for cell c;

$f_c(i)$ is closed loop power control component for the cell of subframe i.

The above PHR gives the determined transmission power $P_{NPUSCH,c}(i)$ in dBm.

To provide eMTC with the RB sized frequency allocation, the power control adjustment $f_c(i)$ is not zero and $M_{NPUSCH,c}(i)$ is the bandwidth of the RB sized frequency allocation normalized to 180 KHz. Thus, $M_{NPUSCH,c}(i)$ is equal to 1 for the RB sized frequency allocation. If repetition is indicated by the UL repetition level, the UE 402 may or may not use the maximum transmission power (i.e., $P_{CMAX,c}(i)$ depending on the power computation provided by $10 \log 10 (M_{NPUSCH,c}(i) + P_{O\_NPUSCH,c} + \alpha_c(j)PL_c + f_c(i))$.

It should be noted that this is different than the transmission power determination for NB-IoT. More specifically, in NB-IoT, MNPUSCH,c(i) may be equal to 1, 3, 6, or 12 where $M_{NPUSCH,c}(i)$ is UL transmission bandwidth normalized by 15 KHz (not 180 kHz). Furthermore, the $f_c(i)$ is equal to zero because NB-IoT does not support closed loop power adjustments. Accordingly PHR for eMTC with the RB sized frequency allocation will be computed based on the scheduled bandwidth with 1 dB quantization. On the other hand, PHR for NB-IoT is computed based on a 15 KHz single tone assumption for PUSCH data transmission and quantized to one of four values.

At procedure 430, the UE 402 is configured to determine a transmission power for the (proper) subset of UL data transmissions that are transmitted with the variable UL frequency allocation set to the sub RB sized frequency allocation indicated by the third DCI. In one implementation, the transmission power is determined using the same formula described above. However, fewer tones (and thus less bandwidth) are utilized by the sub RB sized frequency allocation and thus the transmission power for the sub RB sized frequency allocation may be more concentrated in comparison to the RB size frequency allocation.

In one aspect, the transmission power is determined based on a number of tones provided by the sub RB sized frequency allocation. It should be noted that PHR reporting may be provided in the same manner for the sub RB sized frequency allocation and the RB sized frequency allocation. For example, $M_{NPUSCH,c}(i)$ may be normalized by 180 KHz (like in procedure 428) but may be set to a fractional value that indicates the bandwidth of the sub RB sized frequency allocation. For example, $M_{NPUSCH,c}(i)$ may equal $\{¼, ½\}$ for 3-tones and 6-tones resource allocation, respectively. Additionally, in this example, $P_{O\_NPUSCH,c}$ and $\alpha_c(j)$ may have a different value than for the RB sized frequency allocation.

In another aspect, the transmission power is determined based on fixed number of tones irrespective of the sub RB sized frequency allocation. For example, $M_{NPUSCH,c}(i)$ may always be set to 1 irrespective of the bandwidth of the sub RB sized frequency allocation. In this example, $P_{O\_NPUSCH,c}$ and $\alpha_c(j)$ may have a different value than for the RB sized frequency allocation.

In yet another aspect, the transmission power is determined to be a maximum transmission power of the UE 402 when the UE is allocated the sub RB sized frequency allocation. However, the transmission power is determined to be the maximum transmission power of the UE 402 equally distributed among the set of tones of the sub RB sized frequency allocation.

At procedure 432, the UE 402 is configured to transmit and the base station 404 is configured to receive at least one ACK or NACK, which was generated at procedure 416 in response to the one or more DL data transmission. The UE 402 is also configured to transmit and the base station 404 is configured to receive a first subset of UL data transmissions with the variable frequency allocation set to the sub RB sized frequency allocation at procedure 434. For example, the subset of UL data transmissions may be transmitted in the sub RB frequency allocation within the (M)PUSCH. The UE 402 may transmit the first subset of data transmissions with the sub RB frequency allocation when the SNR is high. Furthermore, the first subset of UL data transmissions may be transmitted at the determined transmission power provided by procedure 430. As explained in further detail below, the UE 402 may be configured to transmit the UL data transmission of procedure 434 by employing a RV cycling and scrambling sequence based on whether frequency hopping is enabled. The third DCI that indicates the sub RB sized frequency allocation may also indicate whether frequency hopping is enabled.

As discussed above at procedure 426, the UE 402 is configured to determine whether the first DCI and the third DCI indicate that there will be at least one collision between the at least one UL data transmission and at least one of an ACK NACK in response to the at least one DL data transmission. Thus, as described in further detail below, the UE 402 is configured to adjust at least one of the at least one ACK or NACK (provided at procedure 432) and at least one UL data transmission (provided at procedure 434) in response to determining that there will be at least one collision at procedure 436. Different techniques for making this adjustment and avoiding collisions are discussed below.

The UE 402 is also configured to transmit and the base station 404 is configured to receive a second subset of UL data transmissions with the variable frequency allocation set to the RB sized frequency allocation at procedure 438. For example, the second subset of UL data transmissions may be transmitted with the RB frequency allocation in the PUSCH. The UE 402 may transmit the second subset of data transmissions with the RB sized frequency allocation when the SNR is low. Furthermore, the second subset of UL data transmissions may be transmitted at the determined transmission power provided by procedure 430. Accordingly, given procedure 436 and procedure 440, the UE 402 is configured to transmit a set of UL data transmissions (that include the UL data transmissions in the first and second subset) to the base station in a variable frequency allocation such that the variable frequency allocation switches between the RB sized frequency allocation and the sub RB sized frequency allocation.

While FIG. 4 shows procedure 436 and procedure 438 as being separate. This may or may not be the case. In some implementations, the UL data transmission of the first subset and the UL data transmission of the second subset are at least partially interleaved as the variable frequency allocation is switched dynamically between the sub RB sized frequency allocation and the RB sized frequency allocation depending on transmission conditions such as the SNR. In another implementation, the first subset of the plurality of UL data transmissions are initial UL data transmissions and the second subset of the plurality of UL data transmissions are UL data retransmissions of the initial UL data transmissions.

Thus, in this implementation, the sub RB sized frequency allocation is utilized for the initial UL data transmissions and the RB sized frequency allocations are used for repetitions of the initial UL data transmission. Accordingly, the UL data transmission of the first and the second subset may be interleaved as the initial data transmissions and the data retransmissions are provided. In this case, a total UL transmission bandwidth may be provided as 5 MHz for the RB sized frequency allocation provided for data retransmission and 1.4 MHz for the sub RB sized frequency allocation for initial data transmission. Furthermore, the first mapping table (See procedure 420) that determines the TBS of the second subset of UL data retransmissions may be the same as the first mapping table of UL initial data transmissions. In this manner, the TBS for the UL data retransmissions may be the same as the TBS of the UL initial data transmissions.

Figure 5:
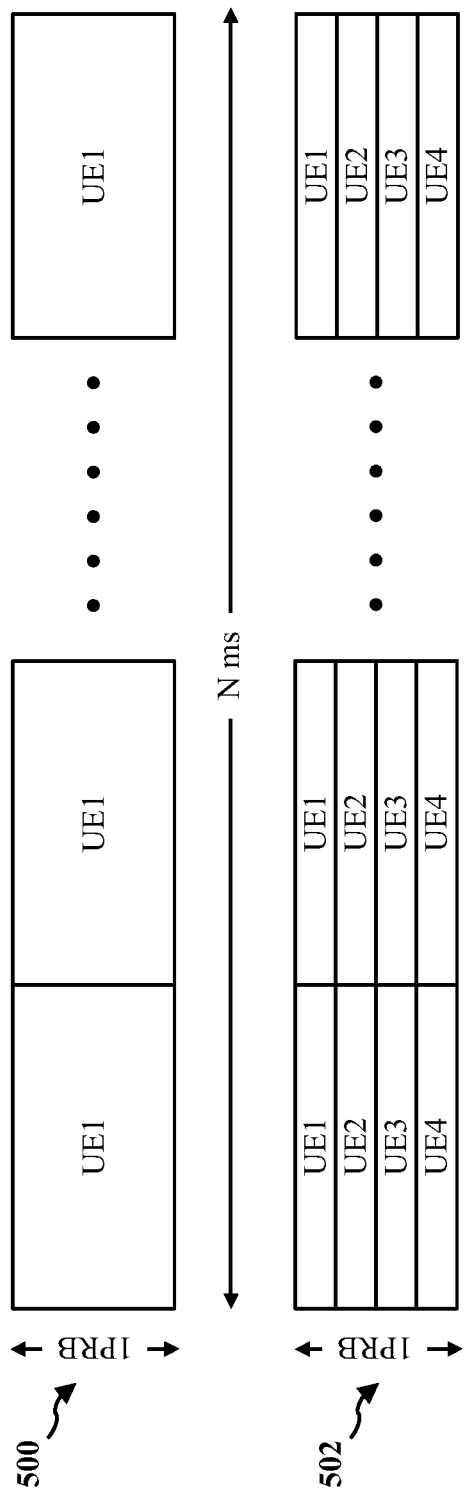
FIG. 5 is a visual illustration of an RB sized frequency allocation and sub RB sized frequency allocations for eMTC UL data transmissions.

FIG. 5 illustrates PRBs 500, 502 with different frequency allocations for PUSCH so that the UE 402 may implement eMTC as described above in FIG. 4. For the sake of explanation, the UE 402 is presumed to be UE1 in FIG. 5. More specifically, the PRB 500 has an RB sized frequency allocation since the entire PRB 500 is allocated to the UE 402 for UL data transmissions within PUSCH (e.g., MPUSCH). As discussed above, the RB sized frequency allocation of PRB 500 may be used to implement eMTC when the SNR is low or for UL data retransmissions. In one aspect, the PRB 500 with the RB sized frequency allocation may be utilized by the UE 402 as fallback. The base station 404 may transmit the second DCI so that the second DCI indicates a PRB allocation where the PRB 500 is allocated to the UE 402. Since the PRB allocation is for the PRB 500, the PRB allocation is a RB sized frequency allocation.

However, the RB sized frequency allocation may introduce spectral and power inefficiencies. For example, the UE 402 is power limited and, in the deep coverage scenario, the UE 402 may have to distribute its limited power resources over all the tones of the PRB 500. Thus, the UE 402 may not be able to use available power resources to maintain a high SNR. Instead, the UE 402 may have to use repetition to ensure that data is communicated to the base station 404. Thus, the RB sized frequency allocation of the PRB 500 may be used as fallback when the SNR is low and/or for data retransmissions.

FIG. 5 also shows the PRB 502. The PRB 502 has several sub PRB sized frequency allocations for different UEs (UE1, UE2, UE3, UE4). The UE 402 (i.e., UE1) has one of the sub PRB size frequency allocations. In this example, 3 tones of the PRB 502 are allocated to the UE 402. The other 9 tones are allocated to three other UEs (i.e., UE2, UE3, UE4). More specifically, a different subset of 3 tones in the PRB 502 are also allocated to the other UEs. By using a smaller bandwidth for each of the UEs (i.e., UE1, UE2, UE3, UE4), more UEs can be served within the PRB 502 without reducing the data rate for the UEs. Thus, so long as the SNR is high, the PRB 502 with the sub PRB sized frequency allocations is used to implement eMTC. In other implementations, 4 tones are allocated to 3 UEs or 6 tones are allocated to 2 UEs.

For the UE 402, the base station 404 may communicate its sub PRB sized frequency allocation in the PRB 502 in the third DCI. It should be noted that the PRB 500 and the PRB 502 may or may not be the same PRB depending on whether the same PRB is used by the UE 402 for the RB sized frequency allocation and for the sub RB sized frequency allocation.

Figure 6:
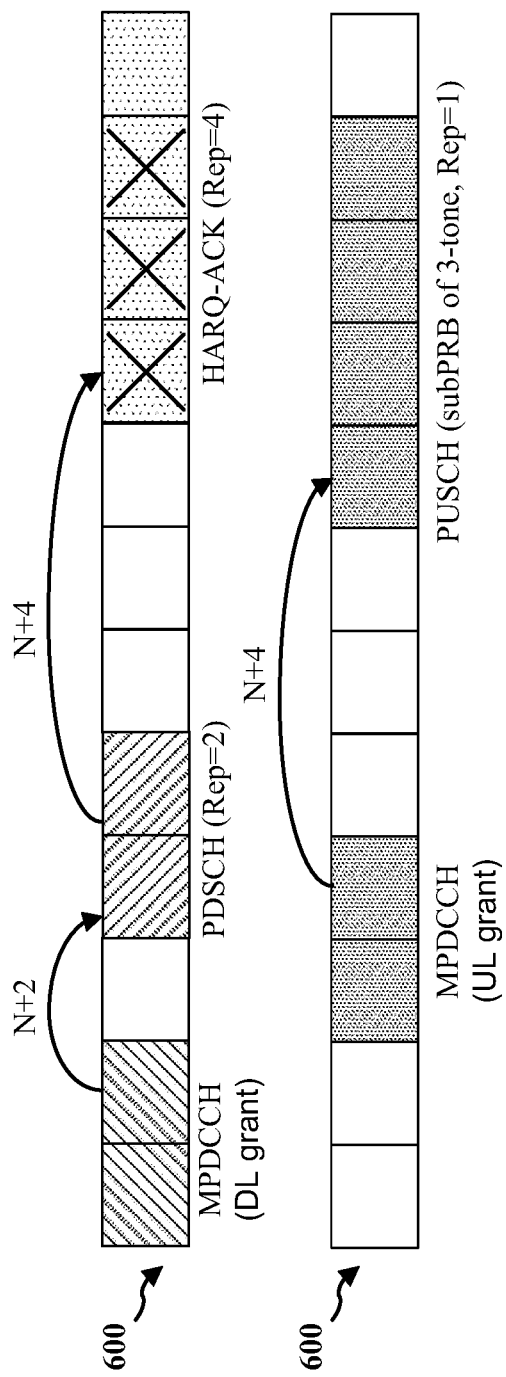
FIGS. 6-7 are time duplex (TD) subframe diagrams that illustrate a drop rule that may be implement by a UE to avoid collisions between ACK/NACK(s) and UL data transmissions in a sub RB sized frequency allocation.

FIG. 6 is a TD subframe diagram illustrating a set of subframes 600 as a function of time. Both of the set of subframes 600 are of the same subframes. However, one of set of subframes 600 visually illustrates the transmission of the first DCI that indicates a DL grant (including DL allocations for the UE 402 in the PDSCH) in an (common) MPDCCH, DL data transmissions from the base station 404 transmitted in the PDSCH, and ACK/NACKs provided by the UE 402 in response to the DL data transmissions. The other one of the set of subframes 600 visually illustrates the transmission of the third DCI that indicates a UL grant (including the sub RB sized frequency allocation) in a (user specific) MPDCCH and the UL data transmissions from the UE 402 transmitted in PUSCH with the variable frequency allocation set to the sub RB sized frequency allocation.

In accordance with the dropping rule, the UE 402 drops each ACK or NACK that would collide with a UL data transmission when the UL repetition level is equal to 1 and/or the ACK/NACK repetition level is larger than 1. The first DCI from the base station 404 indicates a ACK/NACK repetition level of the at least one ACK or NACK and the third DCI from the base station 404 indicates a UL repetition level of the at least one UL data transmissions. In this example, the ACK/NACK repetition level is 2 and the UL repetition level is 1. Thus, each of the four UL data transmissions are not repetitions but rather may be associated with the same TB given that the sub RB sized frequency allocation is set to three tones and thus 4 subframes (each including a UL data transmission) are needed to transmit the TB to the base station 404.

The UE 402 determines whether the first DCI and the third DCI indicate that there will be a collision (see procedure 426). For example, the first DCI and the third DCI indicate that the DL data transmissions in the PDSCH are provided 2 subframes after the last subframe with the DL grant and the ACK/NACKs are provided 4 subframes after the last subframe of the DL data transmission in the PDSCH. Furthermore, the first subframe with UL grant is provided one subframe after the first subframe for the DL grant. Additionally, the UL data transmissions in the PUSCH are provided 4 subframes after the last subframe of the UL grant. As such, the UE 402 determines that there would be a collision between 3 of the 4 ACK/NACKS and the 4 UL data transmission. Since the UL repetition level is equal to 1 and the ACK/NACK repetition level is greater than 2, the UE 402 is configured to drop the 3 ACK/NACKS that would cause a collision and instead simply transmit the 4 UL data transmissions and one ACK.NACK. In this manner, the UE 402 avoids the collision.

Figure 7:
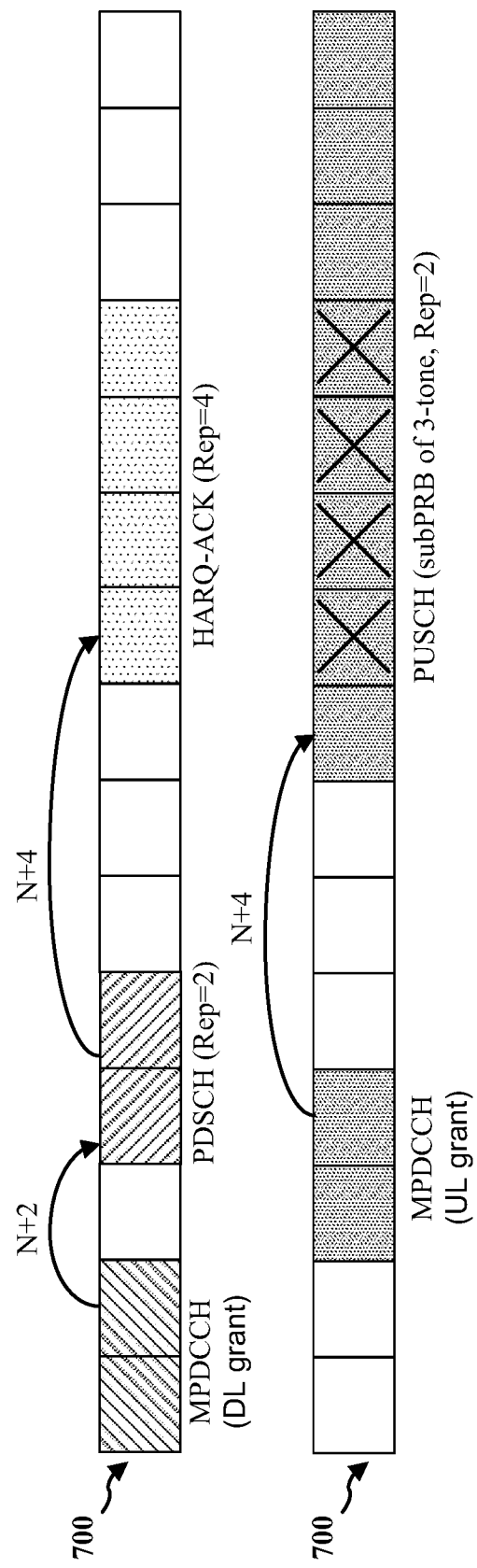

FIG. 7 is a TD subframe diagram illustrating a set of subframes 700 as a function of time. Again, both of the set of subframes 700 are of the same subframes. However, one of set of subframes 700 visually illustrate the transmission of the first DCI that indicates a DL grant (including DL allocations for the UE 402 in the PDSCH) in an (common) MPDCCH, DL data transmissions from the base station 404 transmitted in the PDSCH, and ACK/NACKs provided by the UE 402 in response to the DL data transmissions. The other one of the set of subframes 700 visually illustrate the transmission of the third DCI that indicates a UL grant (including the sub RB sized frequency allocation) in a (user specific) MPDCCH and the UL data transmissions from the UE 402 transmitted in PUSCH with the variable frequency allocation set to the sub RB sized frequency allocation.

In accordance with the dropping rule, the UE 402 drops each UL data transmission that would collide with one or more ACK or NACKs when the UL repetition level is greater than 1 and/or the ACK/NACK repetition level is equal to 1. Again, the first DCI from the base station 404 indicates a ACK/NACK repetition level of the at least one ACK or NACK and the third DCI from the base station 404 indicates a UL repetition level of the at least one UL data transmissions. In this example, the ACK/NACK repetition level is 4 and the UL repetition level is 2. Without any adjustments, 4 of 8 subframes in the PUSCH are for UL initial data transmissions and 4 of 8 subframes in the PUSCH are for UL data retransmissions. The 8 subframes in the PUSCH are thus associated with the same TB and the last 4 of the 8 subframes that are for UL data transmissions would simply be repetitions of the UL data transmission in the first 4 of 8 subframes.

The UE 402 determines whether the first DCI and the third DCI indicate that there will be a collision (see procedure 426). For example, the first DCI and the third DCI indicate that the DL data transmissions in the PDSCH are provided 2 subframes after the last subframe with the DL grant and the ACK/NACKs are provided 4 subframes after the last subframe of the DL data transmission in the PDSCH. Furthermore, the first subframe with UL grant is provided one subframe after the first subframe for the DL grant. Additionally, the UL data transmissions in the PUSCH are provided 4 subframes after the last subframe of the UL grant. As such, the UE 402 determines that there would be a collision between 4 of 8 of the UL data transmission and 4

ACK/NACKs. Since the UL repetition level is equal to 2 and is thus greater than 1, the UE 402 is configured to drop the 4 UL data transmissions that would cause a collision and instead simply transmit the 4 ACK/NACKs. In this manner, the UE 402 avoids the collision.

Figure 8:
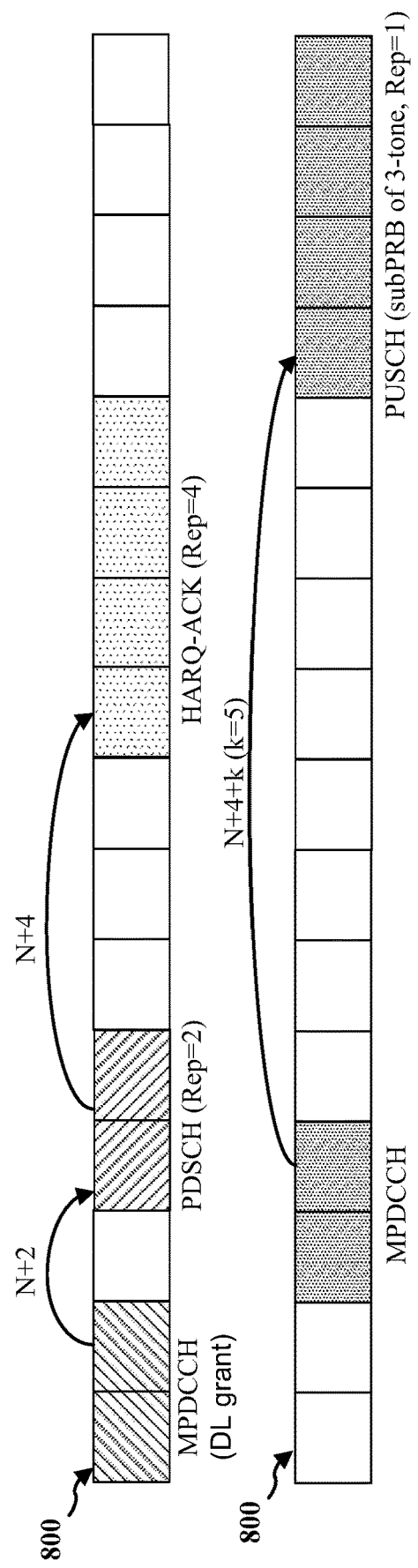
FIG. 8 is a TD subframe diagram that illustrates a subframe delay technique that may be implemented by a UE to avoid collisions between ACK/NACK(s) and UL data transmissions in a sub RB sized frequency allocation.

FIG. 8 illustrates a TD subframe diagram illustrating a set of subframes 800 as a function of time. Again, both of the set of subframes 800 are of the same subframes. However, one of set of subframes 800 visually illustrate the transmission of the first DCI that indicates a DL grant (including DL allocations for the UE 402 in the PDSCH) in an (common) MPDCCH, DL data transmissions from the base station 404 transmitted in the PDSCH, and ACK/NACKs provided by the UE 402 in response to the DL data transmissions. The other one of the set of subframes 800 visually illustrate the transmission of the third DCI that indicates a UL grant (including the sub RB sized frequency allocation) in a (user specific) MPDCCH and the UL data transmissions from the UE 402 transmitted in PUSCH with the variable frequency allocation set to the sub RB sized frequency allocation.

In particular, FIG. 8 illustrates another implementation of procedure 436 where the UE 402 adjust at least one of the at least one ACK or NACK and the at least one UL data transmission (in the sub RB sized frequency allocation) in response to determining that there will be the at least one collision. Unlike the dropping rule of FIGS. 6-7, the UE 402 does not drop either the ACK/NACKs or the UL data transmissions. Instead, in FIG. 8, the UE 402 delays transmission of the UL data transmissions, as explained in further detail below.

The first DCI from the base station 404 indicates a ACK/NACK repetition level of the at least one ACK or NACK and the third DCI from the base station 404 indicates a UL repetition level of the at least one UL data transmissions. In this example, the ACK/NACK repetition level is 4 and the UL repetition level is 1. Thus, each of the four UL data transmissions are not repetitions but rather may be associated with the same TB given that the sub RB sized frequency allocation is set to three tones and thus 4 subframes (each including a UL data transmission) are needed to transmit the TB to the base station 404.

More specifically, the third DCI from the base station 404 indicates a subframe delay number (K). The subframe delay number (K) may be determined by the base station 404 based on the ACK/NACK repetition level. For instance, K may be equal to the ACK/NACK repetition level plus 1. In this example, K is equal to 5 since the ACK/NACK repetition level is 4.

The UE 402 determines whether the first DCI and the third DCI indicate that there will be a collision (see procedure 426). For example, the first DCI and the third DCI indicate that the DL data transmissions in the PDSCH are provided 2 subframes after the last subframe with the DL grant and the ACK/NACKs are provided 4 subframes after the last subframe of the DL data transmission in the PDSCH. Furthermore, the first subframe with UL grant is provided one subframe after the first subframe for the DL grant. Additionally, the UE 402 determines that a collision would occurs if the UL data transmissions in the PUSCH were provided 4 subframes after the last subframe of the UL grant. Accordingly, the UE 402 delays a transmission of the at least one UL data transmission by a number of subframes equal to K. Thus, the UL data transmissions are provided 9 subframes after the last subframe for the UL grant in the MPUCCH and the UE 402 avoids the collision.

It should be noted that the dropping rule of FIGS. 6-7 and the subframe delay of FIG. 8 may be implemented depending on system requirements and design preferences. For instance, when sub RB sized frequency allocation is supported for eMTC, one TB may span multiple UL data transmissions in multiple subframes (even when the UL repetition level is 1 and thus there is no repetition), as explained above in FIGS. 6-8. When temporal resources are of a high priority, the UE 402 may be configured to implement the dropping rule described with respect to FIGS. 6-7 and avoid the delay offset provided by K in FIG. 8. However, the dropping rule can degrade PUSCH performance since UL data transmissions may be dropped to avoid collisions. Thus, when PUSCH performance is a high priority, the UE 402 may use K as described in FIG. 8 to avoid collisions.

FIGS. 9A-9B are TD subframe diagrams that illustrate a set of subframes 900A, 900B as a function of time. In particular, FIGS. 9A-9B relate an implementation of procedure 436 for eMTC where the UE 402 is configured to transmit one or more of UL data transmissions (in the sub RB sized frequency allocation) by employing a RV cycling and scrambling sequence based on whether frequency hopping is enabled. The third DCI (provided to the UE at procedure 412) may indicate whether frequency hopping is enabled. Accordingly, how the UE 402 employs the RV cycling and scrambling sequence for eMTC at procedure 436 depends on whether the third DCI indicates that frequency hopping has been enabled.

In particular, FIG. 9A is a TD subframe diagram that illustrates a set of subframes 900A when the frequency hopping is disabled. As shown in FIG. 9A, at the UE 402 the RV cycling and scrambling sequence is reinitialized after a number of subframes greater than one when the frequency hopping is disabled. The sub RB sized frequency allocation may be provided within the PUSCH for eMTC as described above.

For example, subframes 902A include UL data transmissions with the variable frequency allocation set to the sub RB sized frequency allocation. The UL data transmissions of the subframes 902A are for communicating a TB to the base station 404. Thus, the RV cycling and scrambling sequence is initiated by the UE 402 at the first of the subframes 902A and is used through the last of the subframes 902A. The RV cycling and scrambling sequence is thus started and finished across the block of subframes 902A.

The subframes 904A also include UL data transmissions in the variable frequency allocation set to the sub RB sized frequency allocation. The sub RB sized frequency allocation may be provided within the PUSCH for eMTC as described above. The UL data transmissions of the subframes 904A are for communicating a TB to the base station 404. In this example, the RV cycling and scrambling sequence is reinitiated by the UE 402 at the first of the subframes 904A and is again used through the last of the subframes 904A. The RV cycling and scrambling sequence is thus again initialized at the start of, and used across the block of, subframes 904A. Thus, the RV cycling and scrambling sequence is reinitialized after 4 subframes since a first TB is provided by the block of the subframes 902A and a second TB is provided by the block of subframes 904A.

The number of subframes for applying the RV cycling and scrambling sequence may thus be based on a function of a TBS of the TB and a number of tones provided by the sub RB sized frequency allocation. In this example, 3 tones are allocated to the UE 402 and the TBS of the TB is based on a 1.4 MHz total UL bandwidth. The TB of the subframes 902A and the TB of the subframes 904A may be the same or different.

In one aspect, the TB is the same for the subframes 902A and the subframes 904A such that the UL data transmissions in the subframes 904A are repetitions of the UL data transmission in the subframes 902A. For example, the third DCI may indicate that the UL repetition level is 2. Accordingly, the number of subframes before the RV cycling and scrambling sequence is reinitialized may thus also be based on the UL repetition level for the UL data transmissions in the subframes 902A, 904A. In this aspect, the RV cycling and scrambling sequence may be reinitialized every L consecutive UL subframes, where L=min(Rep/2, 4) and Rep is based on the block size for the subframes 902A, 904A and the UL repetition level. The block size of the subframes 902A, 904A is a function of the TBS of the TB and the number of tones provided by the sub RB sized frequency allocation.

Since the UL data transmissions in block of the subframes 902A are transmitted by employing the same RV cycling and scrambling sequence from start to finish, the base station 404 may concatenate the data in the UL data transmissions and then decode the concatenated data to obtain the TB. The same is true for the subframes 904A. In one aspect, the base station 404 may concatenate the data in the UL data transmissions using non-coherent combining of sub-PRB sized PUSCH.

On the other hand, FIG. 9B is a TD subframe diagram that illustrates the set of subframes 900B when the frequency hopping is enabled. As shown in FIG. 9B, at the UE 402 the RV cycling and scrambling sequence is reinitialized after every subframe when the frequency hopping is enabled. In FIG. 9B, subframes 902B include UL data transmissions with the variable frequency allocation set to the sub RB sized frequency allocation. In this case, the UL data transmissions of the subframes 902B are provided in a first set of tones of a PRB. Subframes 904B include UL data transmissions with the variable frequency allocation set to the sub RB sized frequency allocation. In this case, the UL data transmissions of the subframes 904B are provided in a second set of tones of the PRB. Finally, subframes 906B include UL data transmissions with the variable frequency allocation set to the sub RB sized frequency allocation. In this case, the UL data transmissions of the subframes 906B are provided in the first set of tones of the PRB, just like the UL data transmission of subframes 902B. Thus, the RV cycling and scrambling sequence is reinitialized by the UE 402 every subframe in the subframes 902B, 904B, 906B. The sub RB sized frequency allocation may be provided within the PUSCH for eMTC as described above.

As such, there is no support of non-coherent combining when frequency hopping is enabled. Therefore, the base station 404 may have to first decode the data in each of the UL data transmission of the subframes 902B, 904B, 906B and then concatenate the data after decoding to obtain the TB.

FIG. 10 is a flowchart 1000 of a method of wireless communication. In particular, the flowchart 1000 illustrates a method of eMTC wireless communication. The method may be performed by a UE (e.g., the UE 104 and/or the UE 402). At 1002, the UE receives first DCI from a base station (e.g., the base station 180 and/or the base station 404) wherein the first DCI indicates a RB sized frequency allocation for the UE. Thus, note that the first DCI of FIG. 10 corresponds to the second DCI of FIG. 4. As such, the first DCI of FIG. 10 may be received within a common search space, such as a common PDCCH. At 1004, the UE receives a second DCI from the base station, wherein the second DCI indicates a sub RB sized frequency allocation for the UE.

Thus, note that the second DCI of FIG. 10 corresponds to the third DCI of FIG. 4. As such, the second DCI of FIG. 10 may be received within a user specific search space, such as a user specific PDCCH.

The first DCI may comprise a first DCI format and the second DCI may comprise a second DCI format. In some aspects, the first DCI format is different from the second DCI format. For example, the first DCI may comprise either DCI format 6-0A or DCI format 6-0B while the second DCI format comprises a DCI format N0. The second DCI format may further comprise an allocation of padding bits such that the second DCI format has a payload size equal to a payload size of DCI format 6-1A or DCI format 6-1B. In another aspect, the first DCI format and the second DCI format are the same. For example, the first DCI may comprise either DCI format 6-0A or DCI format 6-0B while the second DCI format may also comprise either DCI format 6-0A or DCI format 6-0B.

Finally, at 1006, the UE transmits a plurality of UL data transmissions to the base station in a variable frequency allocation such that plurality of UL data transmissions switches between using the RB sized frequency allocation and the sub RB sized frequency allocation. Thus, a first subset of the UL data transmissions are transmitted with the variable frequency allocation set to the RB sized frequency allocation and a second subset of the UL data transmissions are transmitted with the variable frequency allocation set to the sub RB sized frequency allocation.

TBSs for UL data may be chosen by the UE in order to maximize peak data rates. Thus, the UE selects a first mapping table based on the variable frequency allocation set to the RB sized frequency allocation of the first DCI at 1008. At 1010, the UE determines a first TBS from the first mapping table for a first subset of the plurality of data transmissions that are transmitted with the variable frequency allocation set to the RB sized frequency allocation indicated by the first DCI.

The UE also selects a second mapping table based on the variable frequency allocation set to the sub RB sized frequency allocation of the second DCI at 1012. At 1014, the UE determines a second TBS from the second mapping table for the second subset of the plurality of data transmissions that are transmitted with the variable frequency allocation set to the sub RB sized frequency allocation indicated by the second DCI.

In one aspect, the RB sized frequency allocation may be used as fallback when the SNR is low. On the other hand, the sub RB sized frequency allocation may be used in deep coverage situations. In this case, a largest TBS of the first mapping table is larger than a largest TBS of the second mapping table.

In another aspect, the second subset of the plurality of UL data transmissions based on the sub-RB sized frequency allocation are initial data transmissions and the first subset of the plurality of UL data transmissions based on the RB sized frequency allocation are retransmissions of the initial data transmissions. In this case, the first mapping table is the same as the second mapping table. As such, the TBS for the first subset of the plurality of UL data transmissions and the TBS for the second subset of the plurality of UL data transmissions may be equal.

FIG. 11 is a flowchart 1100 of a method of wireless communication. In particular, the flowchart 1100 illustrates a method of eMTC wireless communication. The method may be performed by a UE (e.g., the UE 104 and/or the UE 402). At 1102, the UE receives DCI from a base station (e.g., the base station 180 and/or the base station 404) wherein the DCI indicates a sub RB sized frequency allocation for the UE. Note that the DCI in FIG. 11 corresponds to the third DCI in FIG. 4. At 1104, the UE determines transmission power for the UE based on the sub RB sized frequency allocation. In some aspects, the transmission power is determined based on a number of tones provided by the sub RB sized frequency allocation. In other aspects, the transmission power is determined based on a fixed number of tones irrespective of the sub RB sized frequency allocation. In still other aspects, the transmission power is determined to be a maximum transmission power. Finally, at procedure 1106, the UE transmits a data transmission to the base station at approximately the determined transmission power.

Figure 12:
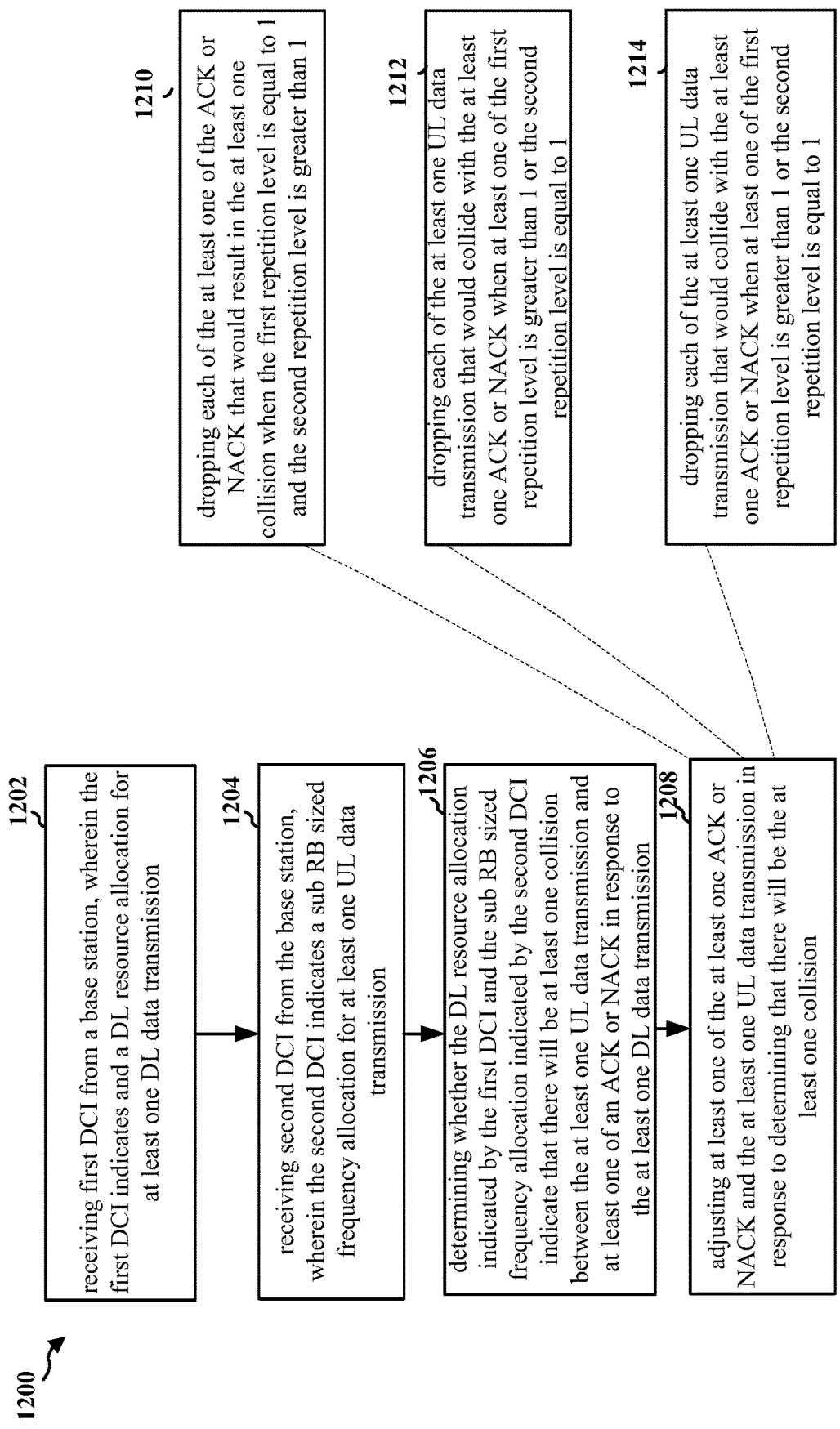
FIG. 12 is a flowchart illustrating a method of eMTC wireless communication by a UE.

FIG. 12 is a flowchart 1200 of a method of wireless communication. In particular, the flowchart 1200 illustrates a method of eMTC wireless communication. The method may be performed by a UE (e.g., the UE 104 and/or the UE 402). At 1202, the UE receives first DCI from a base station (e.g., the base station 180 and/or the base station 404) wherein the first DCI indicates a DL resource allocation for at least one DL data transmission. Note that the first DCI in FIG. 12 corresponds to the first DCI in FIG. 4. At 1204, the UE receives second DCI from the base station, wherein the second DCI indicates a sub RB sized frequency allocation for at least one UL data transmission. Thus, note that the second DCI of FIG. 12 corresponds to the third DCI in FIG. 4.

At 1206, the UE determines whether the DL resource allocation indicated by the first DCI and the sub RB sized frequency allocation indicated by the second DCI indicate that there will be at least one collision between the at least one UL data transmission and at least one of an acknowledgement (ACK) or negative acknowledgement (NACK) in response to the at least one DL data transmission. Finally, at 1208, the UE adjusts at least one of the at least one ACK or NACK and the at least one UL data transmission in response to determining that there will be at least one collision. In one aspect, the UE implements a drop rule. More specifically, the first DCI from the base station may indicate a first repetition level of the at least one ACK or NACK and the second DCI from the base station may indicate a second repetition level of the at least one UL data transmission.

To implement the drop rule and one implementation of 1208, the UE drops each of the at least one of the ACK or NACK that would result in the at least one collision when the first repetition level of the ACK or NACK is greater than 1 and the second repetition level of the UL transmission is equal to 1 at 1210. On the other hand, to implement the drop rule and another implementation of 1208, the UE drops each of the at least one UL data transmission that would collide with the at least one ACK or NACK when at least one of the first repetition level of the ACK or NACK is equal to 1 or the second repetition level of the UL transmission is greater than 1 at 1212.

In another implementation of 1208, the UE may implement a delay to prevent a collision. For example, the second DCI from the base station indicates a subframe delay number (K). At 1214, the UE delays a transmission of the at least one UL data transmission by a number of subframes equal to K in order to implement 1208.

Figure 13:
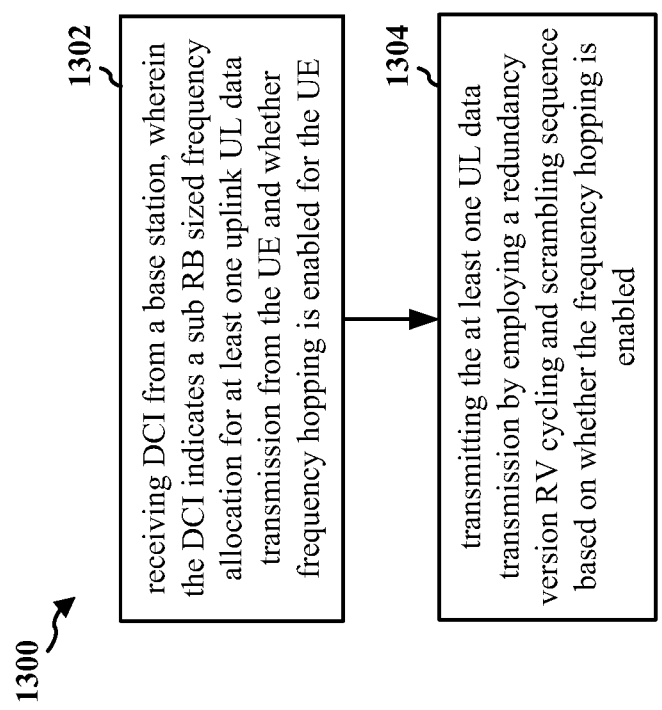
FIG. 13 is a flowchart illustrating a method of eMTC wireless communication by a UE.

FIG. 13 is a flowchart 1300 of a method of wireless communication. In particular, the flowchart 1300 illustrates a method of eMTC wireless communication. The method may be performed by a UE (e.g., the UE 104 and/or the UE 402). At 1302, the UE receives DCI from a base station (e.g., the base station 180 and/or the base station 404) wherein the DCI indicates a sub RB sized frequency allocation for the UE and whether frequency hopping is enabled for the UE. Note that the DCI in FIG. 13 corresponds to the third DCI in FIG. 4. At 1304, the UE transmits the at least one UL data transmission by employing a RV cycling and scrambling sequence based on whether the frequency hopping is enabled.

In one aspect, the RV cycling and scrambling sequence is reinitialized after a number of subframes greater than one when the frequency hopping is disabled. The number of subframes may be based on a repetition level for the at least one UL data transmission. Additionally, the number of subframes may be based on a function of TBS and a number of tones provided by the sub RB sized frequency allocation. Finally, the RV cycling and scrambling sequence may be reinitialized after every subframe when the frequency hopping is enabled.

Figure 14:
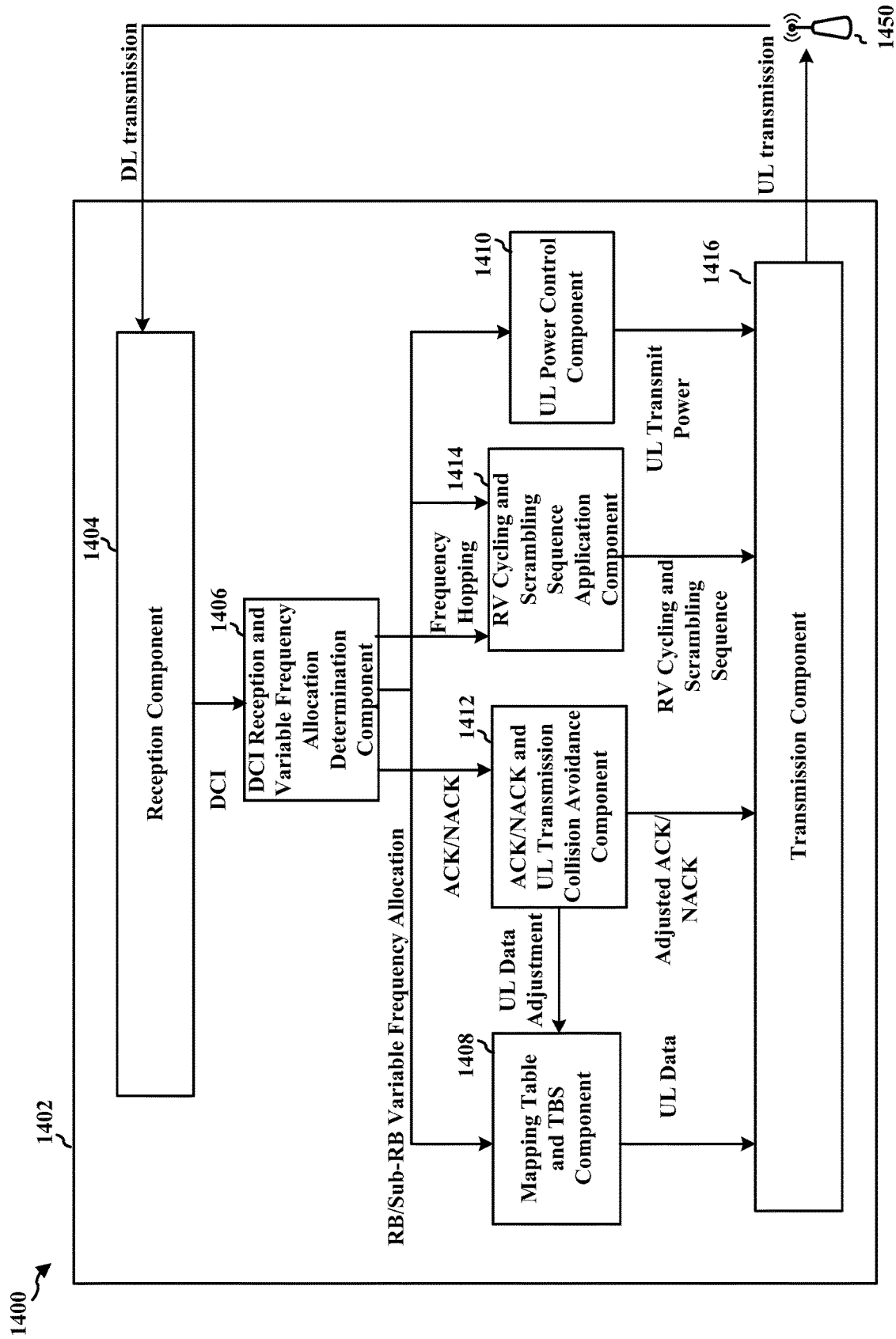
FIG. 14 is a conceptual data flow diagram illustrating the data flow between different means/components in an exemplary apparatus.

FIG. 14 is a conceptual data flow diagram 1400 illustrating the data flow between different modules/means/components in an exemplary apparatus 1402 in accordance with certain aspects of the disclosure. The apparatus 1402 may be the UE of 104, 350, 402, or the apparatus 1502'. The apparatus 1402 includes a reception component 1404, a DCI reception and variable frequency allocation determination component 1406, a mapping table and TBS component 1408, an ACK/NACK and UL transmission collision avoidance component 1412, a RV cycling an scrambling sequence application component 1414, a UL power control component 1410, and a transmission component 1416.

The apparatus may include additional components that perform each of the blocks of the algorithm in the aforementioned flowcharts of FIGS. 10-13. As such, each block in the aforementioned flowcharts of FIGS. 10-13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

For example, the DCI reception and variable frequency allocation determination component 1406 may be configured to receive a first DCI from a base station through the reception component 1404 (e.g., the base station 180 and/or the base station 404) wherein the first DCI indicates a RB sized frequency allocation for the UE. The first DCI may be received within a common search space, such as a common PDCCH. The DCI reception and variable frequency allocation determination component 1406 may be configured to receive a second DCI from the base station, wherein the second DCI indicates a sub RB sized frequency allocation for the UE. The second DCI may be received within a user specific search space, such as a user specific PDCCH.

The DCI reception and variable frequency allocation determination component 1406 may also be configured to generate a RB/sub-RB variable frequency allocation such that the variable frequency allocation switches between the RB sized frequency allocation and the sub RB sized frequency allocation. Thus, a first subset of the UL data transmissions are transmitted with the variable frequency allocation set to the RB sized frequency allocation and a second subset of the UL data transmissions are transmitted with the variable frequency allocation set to the sub RB sized frequency allocation.

The mapping table and TBS component 1408 may be configured to receive the RB/sub-RB variable frequency allocation and to select a mapping table based on the variable frequency allocation set to the RB sized frequency allocation. The mapping table and TBS component 1408 may be configured to determine a first TBS from the first mapping table for a first subset of the plurality of UL data transmissions that are transmitted with the variable frequency allocation set to the RB sized frequency allocation. The mapping table and TBS component 1408 may also be configured to select a second mapping table based on the variable frequency allocation set to the sub RB sized frequency allocation, and to determine a second TBS from the second mapping table for the second subset of the plurality of UL data transmissions that are transmitted with the variable frequency allocation set to the sub RB sized frequency allocation. The mapping table and TBS component 1408 may also be configured to generate the UL data and to adjust the UL data based on a UL data adjustment signal to avoid collisions with ACK/NACK.

The UL power control component 1410 may be configured to receive the RB/sub-RB variable frequency allocation and to determine UL transmission power for the apparatus 1402 based on the sub RB sized frequency allocation. In some aspects, the transmission power is determined based on a number of tones provided by the sub RB sized frequency allocation. In other aspects, the transmission power is determined based on a fixed number of tones irrespective of the sub RB sized frequency allocation. In still other aspects, the transmission power is determined to be a maximum transmission power.

The UL transmission collision avoidance component 1412 may be configured to receive the RB/sub-RB variable frequency allocation and at least one ACK or NACK in response to at least one DL data transmission, and to determine whether there will be at least one collision between the at least one UL data transmission and the ACK/NACK. The UL transmission collision avoidance component 1412 may be configured to generate a UL data adjustment signal to adjust the UL data transmissions or may be configured to adjust the ACK/NACK in response to determining that there will be at least one collision. In one aspect, the UL transmission collision avoidance component 1412 may implement a drop rule based on a first repetition level of the ACK/NACK and a second repetition level of the UL data transmission. In one aspect, repetitions of the ACK/NACK may be dropped if the repetitions of the ACK/NACK may result in at least one collision when the first repetition level of the ACK or NACK is greater than 1 and the second repetition level of the UL transmission is equal to 1. In one aspect, one or more of the UL data transmissions may be dropped if the UL data transmissions may collide with the ACK/NACK when at least one of the first repetition level of the ACK or NAC is equal to 1 or the second repetition level of the UL transmission is greater than 1. In one aspect, the UL transmission collision avoidance component 1412 may be configured to implement a delay to prevent a collision.

The RV cycling an scrambling sequence application component 1414 may be configured to receive the RB/sub-RB variable frequency allocation and an indication of whether frequency hopping is enabled for the UL data transmissions, and to generate a RV cycling and scrambling sequence based on whether the frequency hopping is enabled. In one aspect, the RV cycling and scrambling sequence is reinitialized after a number of subframes greater than one when the frequency hopping is disabled. The number of subframes may be based on a repetition level for the at least one UL data transmission. Additionally, the number of subframes may be based on a function of TBS and a number of tones provided by the sub RB sized frequency allocation. Finally, the RV cycling and scrambling sequence may be reinitialized after every subframe when the frequency hopping is enabled.

The transmission component 1416 may be configured to receive the UL data that may have been adjusted to avoid collisions with the ACK/NACK, the adjusted ACK/NACK to avoid collisions with the UL data, the RV cycling and scrambling sequence, and the UL transmit power, and to generate the UL transmissions of the UL data to the base station.

Figure 15:
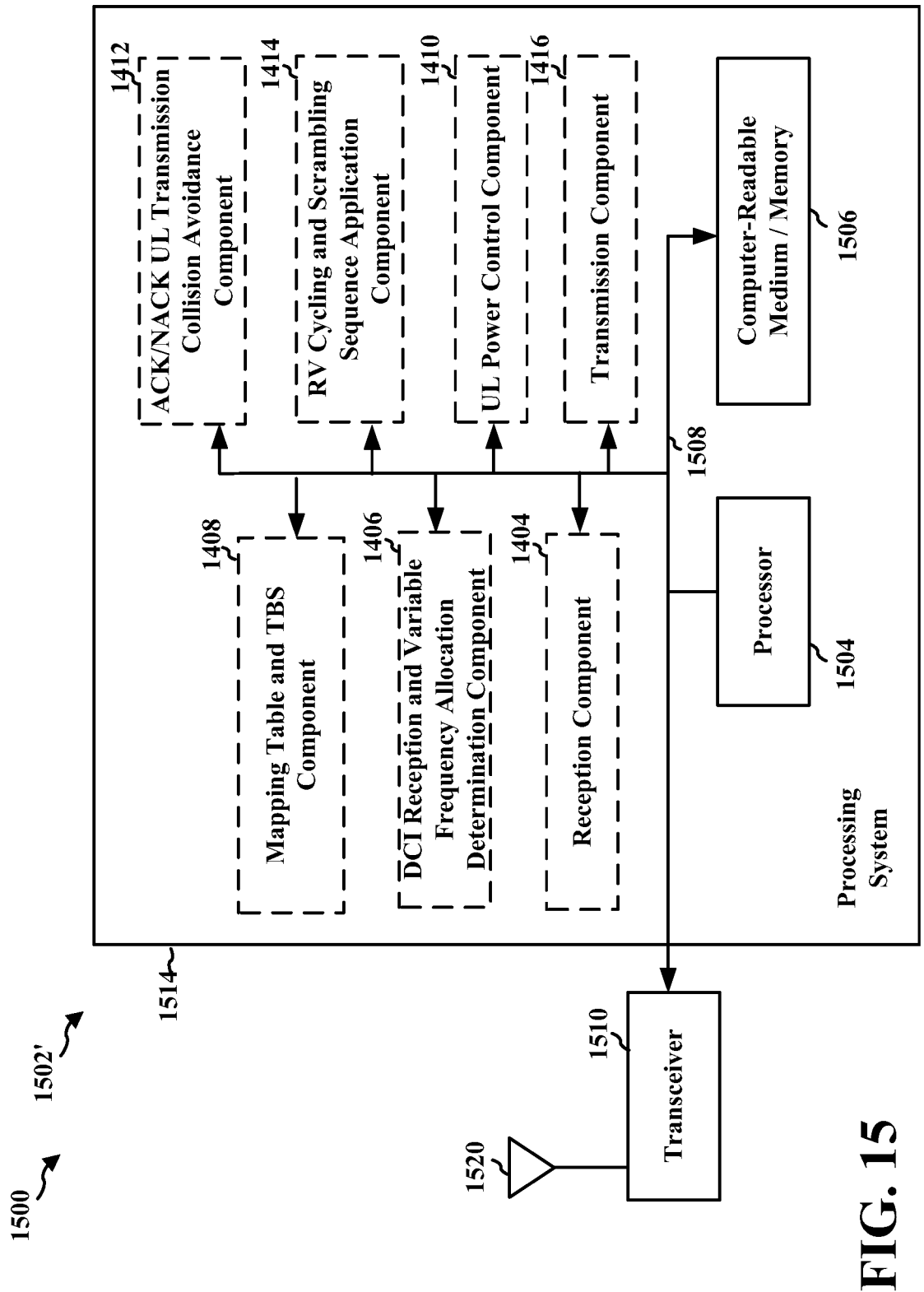
FIG. 15 is a diagram illustrating an example of a hardware implementation for an apparatus employing a processing system.

FIG. 15 is a diagram 1500 illustrating an example of a hardware implementation for an apparatus 1502' employing a processing system 1514 in accordance with certain aspects of the disclosure. The processing system 1514 may be implemented with a bus architecture, represented generally by the bus 1508. The bus 1508 may include any number of interconnecting buses and bridges depending on the specific application of the processing system 1514 and the overall design constraints. The bus 1508 links together various circuits including one or more processors and/or hardware components, represented by the processor 1504, the transceiver 1510, components 1404, 1406, 1408, 1410, 1412, 1414, 1416, and the computer-readable medium/memory 1506. The bus 1508 may also link various other circuits such as timing sources, peripherals, voltage regulators, and power management circuits, which are well known in the art, and therefore, will not be described any further.

The processing system 1514 may be coupled to the transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal such as the DCI, and provides the extracted information to the processing system 1514, specifically the DCI reception and variable frequency allocation determination component 1406 through the reception component 1404. In addition, the transceiver 1510 receives information from the processing system 1514, specifically the UL data transmissions and the ACK/NACK through the transmission component 1416, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412, 1414, 1416. The components may be software components running in the processor 1504 configured to perform the stated processes/algorithm, resident/stored in the computer readable medium/memory 1506 for implementation by the processor 1504, one or more hardware components coupled to the processor 1504, or some combination thereof.

In one configuration, the apparatus 1502' for wireless communication includes means for receiving DCI from a base station and for determining the RB/sub-RB variable frequency allocation from the DCI and for switching between the RB sized frequency allocation and the sub-RB sized frequency allocation. The apparatus 1502' also includes means for selecting a mapping table based on the variable frequency allocation and for determining a TBS from the mapping table. The apparatus 1502' also includes means for determining UL transmission power for the apparatus 1502' based on the variable frequency allocation. The apparatus 1502' also includes means for determining whether there will be at least one collision between UL data transmissions and one or more ACK/NACKs in response to DL data transmissions, and for avoiding the collision by adjusting one or more of the UL data transmissions or one or more of the ACK/NACKs. The apparatus 1502' also includes means for generating a RV cycling and scrambling sequence to be applied to the UL data transmissions based on the variable frequency allocation and whether frequency hopping is enabled. The apparatus 1502' also includes means for transmitting the UL transmissions that switch between the RB sized frequency allocation and the sub-RB sized frequency allocation based on UL data that may have been adjusted to avoid collisions with one or more ACK/NACKs, one or more ACK/NACKs that may have been adjusted to avoid collisions, a RV cycling and scrambling sequence, and UL transmit power. The aforementioned means may be one or more of the aforementioned components of the apparatus 1402 and/or the processing system 1514 of the apparatus 1502' configured to perform the functions recited by the aforementioned means. As described supra, the processing system 1514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a user equipment (UE), comprising:
   receiving a first downlink control information (DCI) from a base station, the first DCI indicating a resource block (RB) sized frequency allocation for the UE;
   receiving a second DCI from the base station, the second DCI indicating a sub RB sized frequency allocation for the UE; and
   transmitting a plurality of uplink (UL) data transmissions to the base station in a variable frequency allocation, a first subset of the plurality of UL data transmissions being transmitted with the variable frequency allocation set to the RB sized frequency allocation and a second subset of the plurality of UL data transmissions being transmitted with the variable frequency allocation set to the sub RB sized frequency allocation,
   a channel state information (CSI) request field in the first DCI being reserved and used by the second DCI to indicate the sub RB sized frequency allocation.

2. The method of claim 1, wherein the first DCI is received within a common search space and the second DCI is received within a user specific search space.

3. The method of claim 1, wherein the first DCI comprises a first DCI format and the second DCI comprises a second DCI format, wherein the first DCI format used to indicate the RB sized frequency allocation is extended for use by the second DCI format to indicate the sub RB sized frequency allocation.

4. The method of claim 1, further comprising:
   selecting a first mapping table based on the first DCI indicating the RB sized frequency allocation;
   determining a first transport block size (TBS) from the first mapping table for the first subset of the plurality of UL data transmissions that are transmitted with the variable frequency allocation set to the RB sized frequency allocation indicated by the first DCI;
   selecting a second mapping table based on the second DCI indicating the sub RB sized frequency allocation; and
   determining a second TBS from the second mapping table for the second subset of the plurality of UL data transmissions that are transmitted with the variable frequency allocation set to the sub RB sized frequency allocation indicated by the second DCI.

5. The method of claim 4, wherein:
   the second subset of the plurality of UL data transmissions are initial data transmissions;
   the first subset of the plurality of UL data transmissions are data retransmissions of the initial data transmissions; and
   the first mapping table is a same mapping table as the second mapping table.

6. The method of claim 1, further comprising:
   determining a transmission power for the UE based on the sub RB sized frequency allocation; and transmitting to the base station the second subset of the plurality of UL data transmissions at the transmission power with the variable frequency allocation set to the sub RB sized frequency allocation.

7. The method of claim 6, wherein the transmission power is scaled based on a number of tones provided by the sub RB sized frequency allocation.

8. The method of claim 6, wherein the transmission power is determined to be a maximum transmission power.

9. The method of claim 1, further comprising:
receiving a third DCI from the base station, wherein the third DCI indicates a downlink (DL) resource allocation for at least one DL data transmission;
determining whether the sub RB sized frequency allocation for use by the plurality of UL data transmissions indicated by the second DCI and the DL resource allocation for use by the at least one DL data transmission indicated by the third DCI indicate that there will be at least one collision between the plurality of UL data transmissions and at least one of an acknowledgement (ACK) or a negative acknowledgement (NACK) in response to the at least one DL data transmission; and
adjusting at least one of the plurality of UL data transmissions in response to determining that there will be the at least one collision.

10. The method of claim 9, wherein the second DCI from the base station indicates a first repetition level of the at least one of the plurality of UL data transmissions and the third DCI from the base station indicates a second repetition level of the at least one of the ACK or the NACK, and wherein adjusting at least one of the plurality of UL data transmissions comprises dropping each UL data transmission of the plurality of the UL data transmissions that would collide with the at least one of the ACK or the NACK when at least one of the first repetition level is greater than 1 or the second repetition level is equal to 1.

11. The method of claim 1, wherein the second DCI indicates whether frequency hopping is enabled for the UE, the method further comprising:
transmitting the second subset of the plurality of UL data transmissions by employing a redundancy version (RV) cycling and scrambling sequence based on whether the frequency hopping is enabled.

12. An apparatus for wireless communication at a user equipment (UE), comprising:
a memory; and
at least one processor coupled to the memory and configured to:
receive a first downlink control information (DCI) from a base station, the first DCI indicating a resource block (RB) sized frequency allocation for the apparatus;
receive a second DCI from the base station, the second DCI indicating a sub RB sized frequency allocation for the UE; and
transmit a plurality of uplink (UL) data transmissions to the base station in a variable frequency allocation, a first subset of the plurality of UL data transmissions being transmitted with the variable frequency allocation set to the RB sized frequency allocation and a second subset of the plurality of UL data transmissions being transmitted with the variable frequency allocation set to the sub RB sized frequency allocation, a channel state information (CSI) request field in the first DCI being reserved and used by the second DCI to indicate the sub RB sized frequency allocation.

13. The apparatus of claim 12, wherein the first DCI is received within a common search space and the second DCI is received within a user specific search space.

14. The apparatus of claim 12, wherein the first DCI comprises a first DCI format and the second DCI comprises a second DCI format, wherein the first DCI format used to indicate the RB sized frequency allocation is extended for use by the second DCI format to indicate the sub RB sized frequency allocation.

15. The apparatus of claim 12, wherein the processor is further configured to:
select a first mapping table based on the first DCI indicating the RB sized frequency allocation;
determine a first transport block size (TBS) from the first mapping table for the first subset of the plurality of UL data transmissions that are transmitted with the variable frequency allocation set to the RB sized frequency allocation indicated by the first DCI;
select a second mapping table based on the second DCI indicating the sub RB sized frequency allocation; and
determine a second TBS from the second mapping table for the second subset of the plurality of UL data transmissions that are transmitted with the variable frequency allocation set to the sub RB sized frequency allocation indicated by the second DCI.

16. The apparatus of claim 15, wherein:
the second subset of the plurality of UL data transmissions are initial data transmissions;
the first subset of the plurality of UL data transmissions are data retransmissions of the initial data transmissions; and
the first mapping table is a same mapping table as the second mapping table.

17. The apparatus of claim 12, wherein the at least one processor is further configured to:
determine a transmission power for the apparatus based on the sub RB sized frequency allocation; and
transmit to the base station the second subset of the plurality of UL data transmissions at the transmission power with the variable frequency allocation set to the sub RB sized frequency allocation.

18. The apparatus of claim 17, wherein the transmission power is scaled based on a number of tones provided by the sub RB sized frequency allocation.

19. The apparatus of claim 17, wherein the transmission power is determined to be a maximum transmission power.

20. The apparatus of claim 12, wherein the at least one processor is further configured to:
receive a third DCI from the base station, wherein the third DCI indicates a downlink (DL) resource allocation for at least one DL data transmission;
determine whether the sub RB sized frequency allocation for use by the plurality of UL data transmissions indicated by the second DCI and the DL resource allocation for use by the at least one DL data transmission indicated by the third DCI indicate that there will be at least one collision between the plurality of UL data transmissions and at least one of an acknowledgement (ACK) or a negative acknowledgement (NACK) in response to the at least one DL data transmission; and
adjust at least one of the plurality of UL data transmissions in response to determining that there will be the at least one collision.

21. The apparatus of claim 20, wherein the second DCI from the base station indicates a first repetition level of the at least one of the plurality of UL data transmissions and the third DCI from the base station indicates a second repetition level of the at least one of the ACK or the NACK, and wherein the at least one processor is configured to adjust at least one of the plurality of UL data transmissions by being configured to drop each UL data transmission of the plurality of the UL data transmissions that would collide with the at least one of the ACK or the NACK when at least one of the first repetition level is greater than 1 or the second repetition level is equal to 1.

22. The apparatus of claim 12, wherein the second DCI indicates whether frequency hopping is enabled for the apparatus, and the at least one processor is further configured to:
transmit the second subset of the plurality of UL data transmissions by employing a redundancy version (RV) cycling and scrambling sequence based on whether the frequency hopping is enabled.

23. An apparatus for wireless communication at a user equipment (UE), comprising:
means for receiving a first downlink control information (DCI) from a base station, the first DCI indicating a resource block (RB) sized frequency allocation for the apparatus;
means for receiving a second DCI from the base station, the second DCI indicating a sub RB sized frequency allocation for the apparatus; and
means for transmitting a plurality of uplink (UL) data transmissions to the base station in a variable frequency allocation, a first subset of the plurality of UL data transmissions being transmitted with the variable frequency allocation set to the RB sized frequency allocation and a second subset of the plurality of UL data transmissions being transmitted with the variable frequency allocation set to the sub RB sized frequency allocation,
a channel state information (CSI) request field in the first DCI being reserved and used by the second DCI to indicate the sub RB sized frequency allocation.

24. The apparatus of claim 23, wherein the first DCI is received within a common search space and the second DCI is received within a user specific search space.

25. The apparatus of claim 23, further comprising:
means for determining a transmission power for the apparatus based on the sub RB sized frequency allocation; and
means for transmitting to the base station the second subset of the plurality of UL data transmissions at the transmission power with the variable frequency allocation set to the sub RB sized frequency allocation.

26. The apparatus of claim 25, wherein the means for determining the transmission power comprises scaling the transmission power based on a number of tones provided by the sub RB sized frequency allocation.

27. The apparatus of claim 25, wherein the means for determining the transmission power comprises determining a maximum transmission power.

28. The apparatus of claim 23, further comprising:
means for receiving a third DCI from the base station, wherein the third DCI indicates a downlink (DL) resource allocation for at least one DL data transmission;
means for determining whether the sub RB sized frequency allocation for use by the plurality of UL data transmissions indicated by the second DCI and the DL resource allocation for use by the at least one DL data transmission indicated by the third DCI indicate that there will be at least one collision between the plurality of UL data transmissions and at least one of an acknowledgement (ACK) or a negative acknowledgement (NACK) in response to the at least one DL data transmission; and
means for adjusting at least one of the plurality of UL data transmissions in response to determining that there will be the at least one collision.

29. The apparatus of claim 23, wherein the second DCI indicates whether frequency hopping is enabled for the UE, the apparatus further comprising:
means for transmitting the second subset of the plurality of UL data transmissions by employing a redundancy version (RV) cycling and scrambling sequence based on whether the frequency hopping is enabled.

30. A non-transitory computer-readable medium storing computer executable code, comprising code to:
receive a first downlink control information (DCI) from a base station, the first DCI indicating a resource block (RB) sized frequency allocation for an apparatus;
receive a second DCI from the base station, the second DCI indicating a sub RB sized frequency allocation for the apparatus; and
transmit a plurality of uplink (UL) data transmissions to the base station in a variable frequency allocation, a first subset of the plurality of UL data transmissions being transmitted with the variable frequency allocation set to the RB sized frequency allocation and a second subset of the plurality of UL data transmissions being transmitted with the variable frequency allocation set to the sub RB sized frequency allocation,
a channel state information (CSI) request field in the first DCI being reserved and used by the second DCI format to indicate the sub RB sized frequency allocation.

31. The method of claim 3, wherein the second DCI format comprises a same DCI format as the first DCI format.

* * * * *